United States Patent
Okamasu et al.

(10) Patent No.: US 8,270,379 B2
(45) Date of Patent: Sep. 18, 2012

(54) WIRELESS TERMINAL AND WIRELESS COMMUNICATION METHOD

(75) Inventors: Takayuki Okamasu, Fukuoka (JP); Kenji Yamada, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 637 days.

(21) Appl. No.: 11/802,820

(22) Filed: May 25, 2007

(65) Prior Publication Data

US 2007/0230433 A1 Oct. 4, 2007

Related U.S. Application Data

(63) Continuation of application No. PCT/JP2004/017592, filed on Nov. 26, 2004.

(51) Int. Cl.
*H04W 4/00* (2009.01)
(52) U.S. Cl. ............... 370/338; 370/445; 709/238
(58) Field of Classification Search ............. 370/347, 370/328, 338, 310.2, 344, 229, 239, 395.53, 370/321, 337, 315, 351–356, 390, 392, 445; 455/428, 445, 11.1, 13.1, 15, 16, 41.2, 9, 455/502; 709/227, 229, 238, 23–225
See application file for complete search history.

(56) References Cited

U.S. PATENT DOCUMENTS

| | | | | |
|---|---|---|---|---|
| 5,325,088 A * | 6/1994 | Willard et al. | | 340/825.2 |
| 5,987,011 A | 11/1999 | Toh | | |
| 6,687,259 B2 * | 2/2004 | Alapuranen | | 370/437 |
| 6,985,476 B1 * | 1/2006 | Elliott et al. | | 370/349 |
| 7,027,773 B1 * | 4/2006 | McMillin | | 455/41.2 |
| 2004/0013134 A1 * | 1/2004 | Hautala | | 370/476 |
| 2004/0235489 A1 * | 11/2004 | Kwon | | 455/452.2 |
| 2005/0180421 A1 * | 8/2005 | Shimada et al. | | 370/389 |

FOREIGN PATENT DOCUMENTS

| | | |
|---|---|---|
| JP | 2001-231078 | 8/2001 |
| JP | 2004-048478 | 2/2004 |
| WO | WO-9842096 | 9/1998 |
| WO | WO-00/74402 | 12/2000 |

OTHER PUBLICATIONS

European Patent Office, Supplementary European Search Report mailed Aug. 27, 2010, with regard to correspondent EP Patent Application No. 04 82 2442.

* cited by examiner

*Primary Examiner* — Jinsong Hu
*Assistant Examiner* — San Htun
(74) *Attorney, Agent, or Firm* — Fujitsu Patent Center

(57) ABSTRACT

A wireless terminal and wireless communication method that can improve data transfer efficiency and reduce traffic. A frame transmitter of a wireless terminal transmits a frame by wireless. A wireless terminal receives the frame transmitted from the frame transmitter and transmits the received frame by wireless to a wireless terminal. A frame receiver receives the frame transmitted from the succeeding wireless terminal to the wireless terminal. When the frame is received by the frame receiver, a frame reception recognizer recognizes that the frame has been received by the succeeding wireless terminal. It is therefore unnecessary for the wireless terminal to receive, from the succeeding wireless terminal, a frame indicative of reception of the frame, so that the data transfer efficiency improves and the traffic reduces.

11 Claims, 16 Drawing Sheets

13 MANAGEMENT TABLE

| FID | TTL |
|-----|-----|
| 10 | 5 |
| 12 | 3 |
| ⋮ | ⋮ |
| 6 | 2 |

FIG. 6

WIRELESS TERMINAL AND WIRELESS COMMUNICATION METHOD

This application is a continuing application, filed under 35 U.S.C. §111(a), of International Application PCT/JP2004/017592, filed Nov. 26, 2004.

BACKGROUND OF THE INVENTION

1. Field of the Invention

The present invention relates to wireless terminals and wireless communication methods, and more particularly, to a wireless terminal constituting an ad-hoc network to perform communication and a wireless communication method for the wireless terminal.

2. Description of the Related Art

In recent years, ad-hoc network has been watched as one of infrastructures for ubiquitous network society. Ad-hoc network requires no access points, and data is exchanged across a network constituted by wireless terminals connected to one another, such as notebook computers, PDAs, and mobile telephones.

In conventional ad-hoc networks, highly reliable connection-oriented communication is carried out using response frames. Specifically, on receiving a frame, the receiving wireless terminal sends a response frame back to the wireless terminal which transmitted the frame, whereupon the transmitting wireless terminal recognizes that the frame has been normally communicated to the succeeding wireless terminal.

FIG. 15 illustrates the radio coverage areas of wireless terminals. Three wireless terminals 131 to 133 are positioned as illustrated in the figure. A radio coverage area 141 indicates an area where radio waves from the wireless terminal 131 can reach. Accordingly, radio waves from the wireless terminal 131 reach the wireless terminal 132. A radio coverage area 142 indicates an area where radio waves from the wireless terminal 132 can reach, and thus radio waves from the wireless terminal 132 reach the wireless terminals 131 and 133. A radio coverage area 143 indicates an area where radio waves from the wireless terminal 133 can reach; therefore, radio waves from the wireless terminal 133 reach the wireless terminal 132.

In FIG. 15, suppose the case where data is transmitted from the wireless terminal 131 to the wireless terminal 133. Since radio waves from the wireless terminal 131 do not reach the wireless terminal 133, data needs to be relayed by the wireless terminal 132. Specifically, the wireless terminal 131 first transmits a frame (data) to the wireless terminal 132, which then transmits the received frame to the wireless terminal 133.

FIG. 16 is a sequence diagram illustrating operations of the wireless terminals shown in FIG. 15. As in the above example, the wireless terminal 131 transmits data to the wireless terminal 133. In this case, in Step S101, the wireless terminal 131 transmits a frame to the wireless terminal 132. In Step S102, the wireless terminal 132 sends a response frame indicative of reception of the frame back to the wireless terminal 131. Then, in Step S103, the wireless terminal 132 transmits the frame received from the wireless terminal 131 to the wireless terminal 133. In Step S104, the wireless terminal 133 sends a response frame indicative of reception of the frame back to the wireless terminal 132. In this manner, data is successively relayed by the wireless terminals up to the last (destination) wireless terminal in a manner such that each receiving wireless terminal sends a response frame back to the transmitting wireless terminal, thereby achieving highly reliable connection-oriented communication.

Meanwhile, there has been proposed a routing method for establishing an optimal path between a transmission origin node and a destination node in an ad-hoc network (see, e.g., Unexamined Japanese Patent Publication No. 2004-48478 (paragraph nos. [0011] to [0018], FIG. 1)).

In the conventional wireless terminal, however, a response frame has to be sent back to the wireless terminal from which data has been received, with the result that the data transfer efficiency lowers by an amount corresponding to the time required to transmit and receive the response frame. A problem also arises in that traffic increases because of response frames.

SUMMARY OF THE INVENTION

The present invention was created in view of the above circumstances, and an object thereof is to provide a wireless terminal and a wireless communication method therefor wherein the wireless terminal uses, as a response frame, the frame transmitted from the succeeding wireless terminal to another wireless terminal, thereby improving data transfer efficiency and reducing traffic.

To accomplish the above object, the present invention provides a wireless terminal constituting an ad-hoc network to perform communication, comprising: a frame transmitter for transmitting a frame by wireless; a frame receiver for receiving the frame transmitted by wireless from a succeeding wireless terminal, which has received the frame, to another wireless terminal; and a frame reception recognizer, responsive to reception of the frame by the frame receiver, for recognizing that the frame has been received by the succeeding wireless terminal.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 6 shows an exemplary data structure of a management table.

DESCRIPTION OF THE PREFERRED EMBODIMENTS

The principles of the present invention will be described in detail below with reference to the accompanying drawings.

Figure 1:
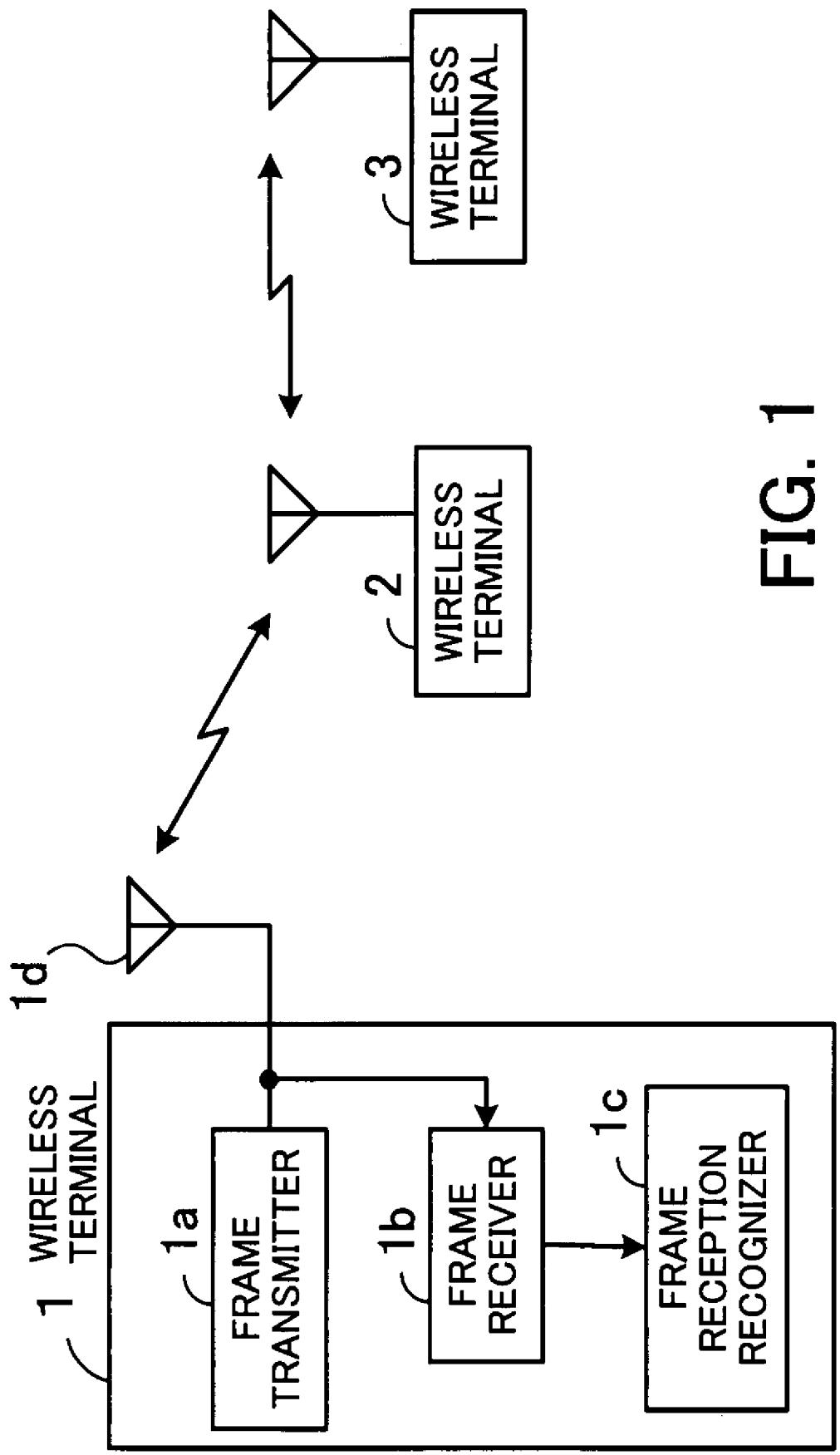
FIG. 1 schematically illustrates a wireless terminal.

FIG. 1 schematically shows wireless terminals. The illustrated wireless terminals 1 to 3 constitute an ad-hoc network and communicate with each other by means of radio waves. The wireless terminal 1 has a radio coverage area covering the wireless terminal 2. The wireless terminal 2 has a radio coverage area covering both the wireless terminals 1 and 3, and the wireless terminal 3 has a radio coverage area covering the wireless terminal 2. Thus, in order to transmit data from the wireless terminal 1 to the wireless terminal 3, the data needs to be relayed by the wireless terminal 2.

The wireless terminal 1 has a frame transmitter 1a, a frame receiver 1b, a frame reception recognizer 1c, and an antenna 1d.

The frame transmitter 1a of the wireless terminal 1 transmits a frame by wireless from the antenna 1d. The succeeding wireless terminal 2 receives the frame from the wireless terminal 1 and then transmits the received frame by wireless to the wireless terminal 3, and at this time, the frame receiver 1b receives the transmitted frame via the antenna 1d. When the frame is received by the frame receiver 1b, the frame reception recognizer 1c recognizes that the frame has been received by the succeeding wireless terminal 2.

In this manner, when the frame received from the frame transmitter 1a is transmitted from the succeeding wireless terminal 2 to the farther wireless terminal 3, the wireless terminal 1 receives the transmitted frame and recognizes that the frame transmitted therefrom has been received by the succeeding wireless terminal 2. It is therefore unnecessary for the wireless terminal to receive from the succeeding wireless terminal a response frame indicative of reception of the frame, whereby the data transfer efficiency improves and the traffic reduces.

A first embodiment of the present invention will be now described in detail with reference to the drawings.

Figure 2:
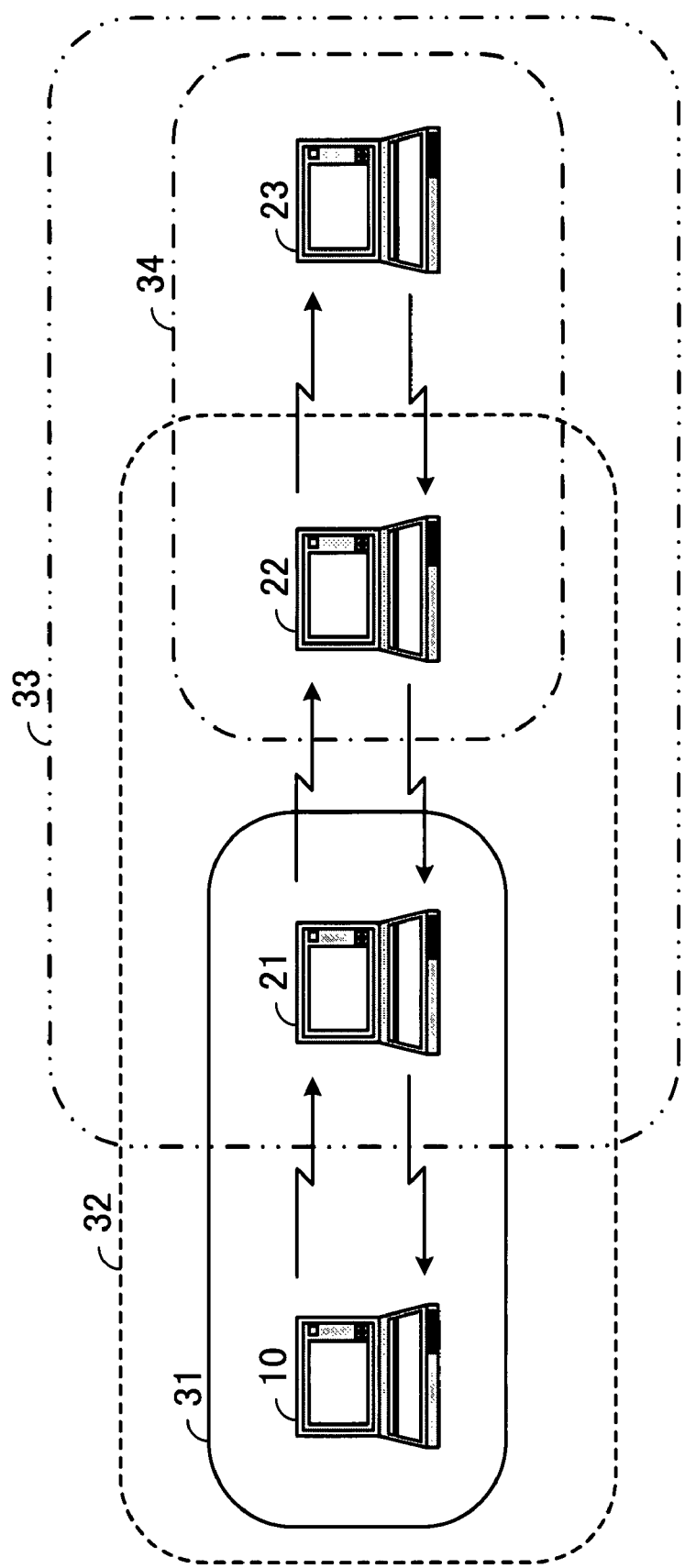
FIG. 2 shows an exemplary configuration of an ad-hoc network constituted by wireless terminals according to a first embodiment.

FIG. 2 shows an exemplary configuration of an ad-hoc network constituted by wireless terminals according to the first embodiment. The illustrated wireless terminals 10 and 21 to 23, which constitute an ad-hoc network, are individually assigned unique identifiers (terminal IDs) and exchange frames according to an ad-hoc network routing protocol using the terminal IDs.

A radio coverage area 31 indicates an area where radio waves from the wireless terminal 10 can reach, and thus radio waves from the wireless terminal 10 reach the wireless terminal 21. A radio coverage area 32 indicates an area where radio waves from the wireless terminal 21 can reach; therefore, radio waves from the wireless terminal 21 reach the wireless terminals 10 and 22. A radio coverage area 33 indicates an area where radio waves from the wireless terminal 22 can reach; therefore, radio waves from the wireless terminal 22 reach the wireless terminals 21 and 23. A radio coverage area 34 indicates an area where radio waves from the wireless terminal 23 can reach; therefore, radio waves from the wireless terminal 23 reach the wireless terminal 22. The wireless terminals 10 and 21, the wireless terminals 21 and 22, and the wireless terminals 22 and 23 are individually interconnected by a two-way link.

Suppose that data is transmitted from the wireless terminal 10 to the wireless terminal 23. In this case, since radio waves from the wireless terminal 10 do not reach the wireless terminal 23, data needs to be relayed by the wireless terminal 21 connected to the wireless terminal 10 by a two-way link as well as by the wireless terminal 22 connected to the wireless terminal 21 by a two-way link. The route for transmitting data via such wireless terminals linked with one another is searched beforehand by using a routing frame, described later.

The wireless terminal 10 generates a frame of data to be transmitted and transmits the generated frame to the wireless terminal 21. The wireless terminal 21 receives the frame from the wireless terminal 10 and transmits the received frame to the wireless terminal 22. At this time, the frame transmitted by wireless from the wireless terminal 21 to the wireless terminal 22 also reaches the wireless terminal 10 connected to the wireless terminal 21 by a two-way link. The wireless terminal 10 receives this frame as a response frame and recognizes that the frame transmitted therefrom has been received by the wireless terminal 21.

On receiving the frame from the wireless terminal 21, the wireless terminal 22 transmits the received frame to the wireless terminal 23. At this time, the frame transmitted by wireless from the wireless terminal 22 to the wireless terminal 23 also reaches the wireless terminal 21 connected to the wireless terminal 22 by a two-way link. The wireless terminal 21 receives this frame as a response frame and recognizes that the frame transmitted therefrom has been received by the wireless terminal 22.

When the frame is received from the wireless terminal 22, the wireless terminal 23 sends a response frame back to the wireless terminal 22. The wireless terminal 23 is the last to receive the frame and does not transmit the frame to any other wireless terminal, and thus the wireless terminal 22 is unable to determine whether the wireless terminal 23 has received the frame or not. Accordingly, the last wireless terminal 23 transmits a response frame to the preceding wireless terminal 22.

In this manner, the frame transmitted (forwarded) from the succeeding wireless terminal to the farther wireless terminal is used as a response frame, whereby highly reliable connection-oriented communication can be realized. Also, the data transfer efficiency can be improved and the traffic reduced.

As the ad-hoc network routing protocol, numerous protocols have been proposed. Since the aforementioned frame transmission/reception is not dependent on any specific protocol, however, the present invention can be applied to various ad-hoc network routing protocols.

An exemplary hardware configuration of the wireless terminal 10 will be now described.

Figure 3:
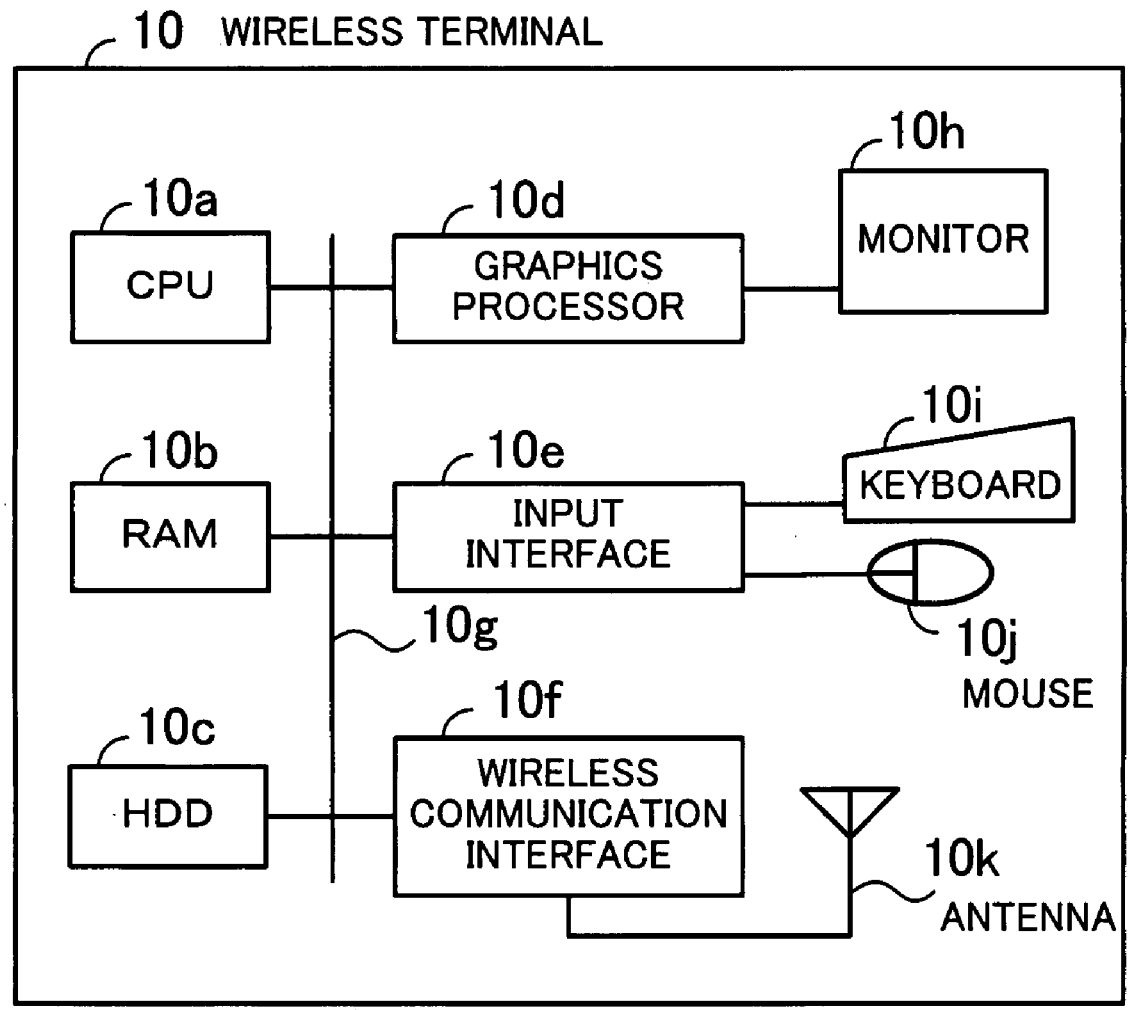
FIG. 3 shows an exemplary hardware configuration of a wireless terminal.

FIG. 3 exemplifies the hardware configuration of the wireless terminal. The wireless terminal 10 operates under the control of a CPU (Central Processing Unit) 10a. The CPU 10a is connected, via a bus 10g, with a RAM (Random Access Memory) 10b, a hard disk drive (HDD) 10c, a graphics processor 10d, an input interface 10e, and a wireless communication interface 10f.

The RAM 10b temporarily stores an OS (Operating System) program executed by the CPU 10a and at least part of an application program for transmitting and receiving data over the ad-hoc network. Also, the RAM 10b stores various other data necessary for the processing by the CPU 10a. The HDD 10c stores the OS and application programs as well as various data.

The graphics processor 10d is connected with a monitor 10h and, in accordance with instructions from the CPU 10a, displays images on the screen of the monitor 10h. The input interface 10e is connected with a keyboard 10i and a mouse 10j, and sends signals from the keyboard 10i and the mouse 10j to the CPU 10a via the bus 10g.

The wireless communication interface 10f is connected to an antenna 10k. In accordance with instructions from the CPU 10a, the wireless communication interface 10f performs wireless communication with other wireless terminals via the antenna 10k.

The processing function of this embodiment is accomplished by the hardware configuration described above. The wireless terminals 21 to 23 also have a hardware configuration identical with that shown in FIG. 3.

The function of the wireless terminal 10 will be now described.

Figure 4:
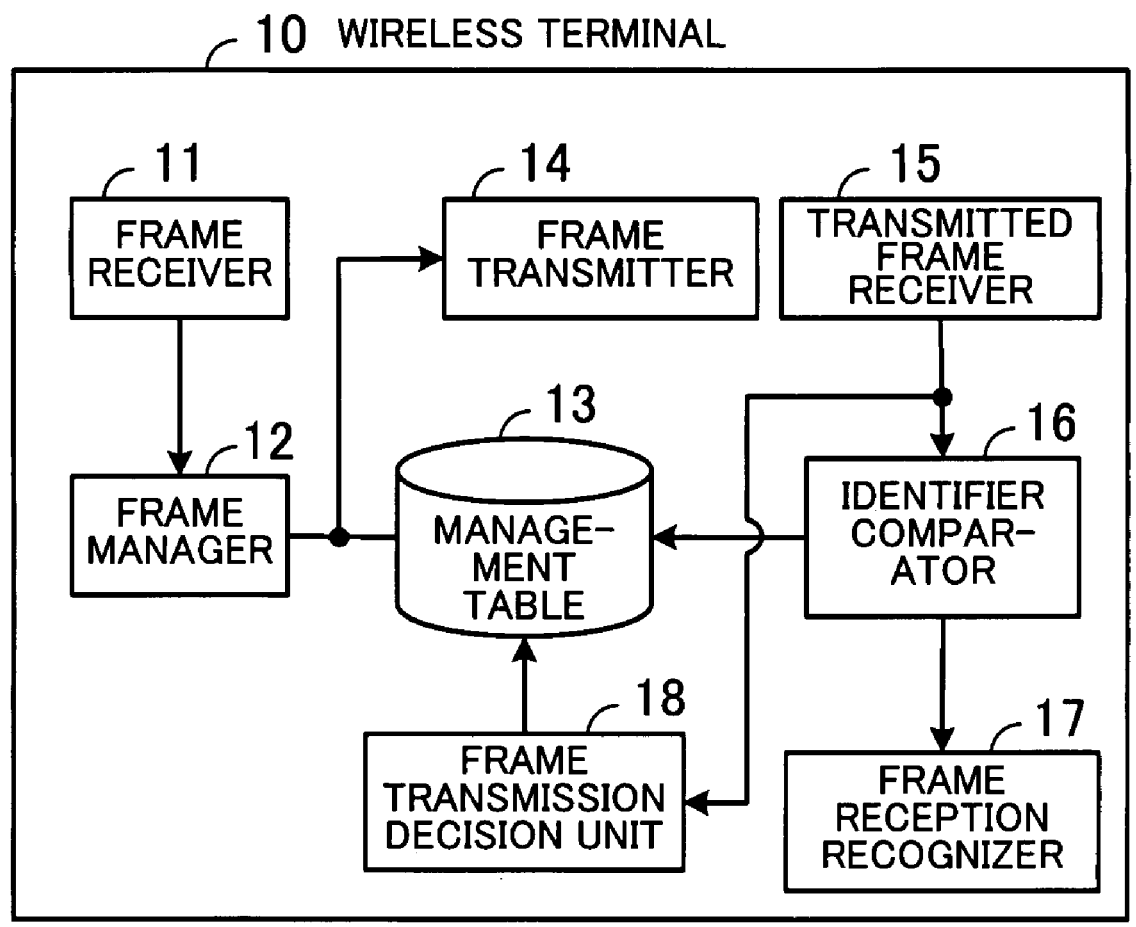
FIG. 4 is a functional block diagram of the wireless terminal.

FIG. 4 is a functional block diagram of the wireless terminal. As illustrated, the wireless terminal 10 has a frame receiver 11, a frame manager 12, a management table 13, a frame transmitter 14, a transmitted frame receiver 15, an identifier comparator 16, a frame reception recognizer 17, and a frame transmission decision unit 18. The wireless terminals 21 to 23 shown in FIG. 2 also have the same function as illustrated in FIG. 4, and thus, in the following, the function of the wireless terminal 10 alone will be described.

The frame receiver 11 receives a frame transmitted from a preceding wireless terminal. In the case of the wireless terminal 22 shown in FIG. 2, for example, the frame receiver receives the frame transmitted from the preceding wireless terminal 21. "Preceding wireless terminal" denotes the wireless terminal which transmits a frame to the local terminal in question, and "succeeding wireless terminal" denotes the wireless terminal to which the local terminal transmits the frame.

The frame manager 12 subtracts "1" from TTL (Time To Live) in the frame received by the frame receiver 11. Then, the frame manager 12 stores, in the management table 13, the thus-decremented TTL as well as the unique frame identifier assigned to the frame received by the frame receiver 11.

An exemplary data structure of the frame will be now described.

Figure 5:
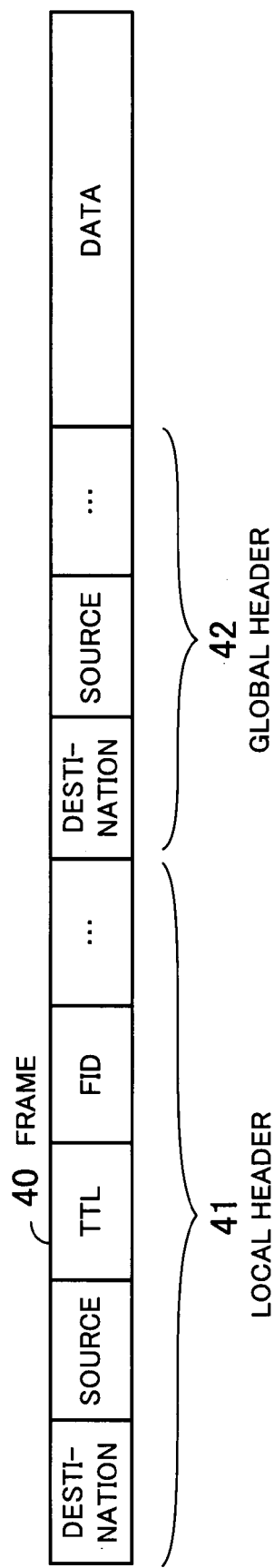
FIG. 5 shows an exemplary data structure of a frame.

FIG. 5 exemplifies the data structure of the frame. As illustrated, the frame 40 is divided into a local header 41, a global header 42, and data. The local header 41 includes the addresses of neighboring wireless terminals between which the frame 40 is passed on in the course of transmission of the frame 40 along the transfer route, TTL, and a frame identifier uniquely assigned to the frame 40. For example, of the neighboring wireless terminals, the MAC address of the destination wireless terminal is stored in the "DESTINATION" field of the local header 41, and the MAC address of the source wireless terminal is stored in the "SOURCE" field. The "TTL" field holds a value which is decremented by "1" each time the frame 40 is relayed, and the "FID" field holds a frame identifier uniquely assigned to the frame 40.

The global header 42 includes the address of the originating wireless terminal which generated the data to be transmitted and from which the frame 40 was originated, and the address of the last wireless terminal for which the frame 40 is destined. For example, the MAC address of the last wireless terminal is stored in the "DESTINATION" field of the global header 42, and the MAC address of the originating wireless terminal is stored in the "SOURCE" field.

Referring again to FIG. 4, the management table 13 stores the frame identifier of the frame received by the frame receiver 11 and the TTL decremented by "1" by the frame manager 12, in a manner associated with each other. The management table 13 is created, for example, in memory such as the RAM 10b or the HDD 10c shown in FIG. 3.

Figure 6:
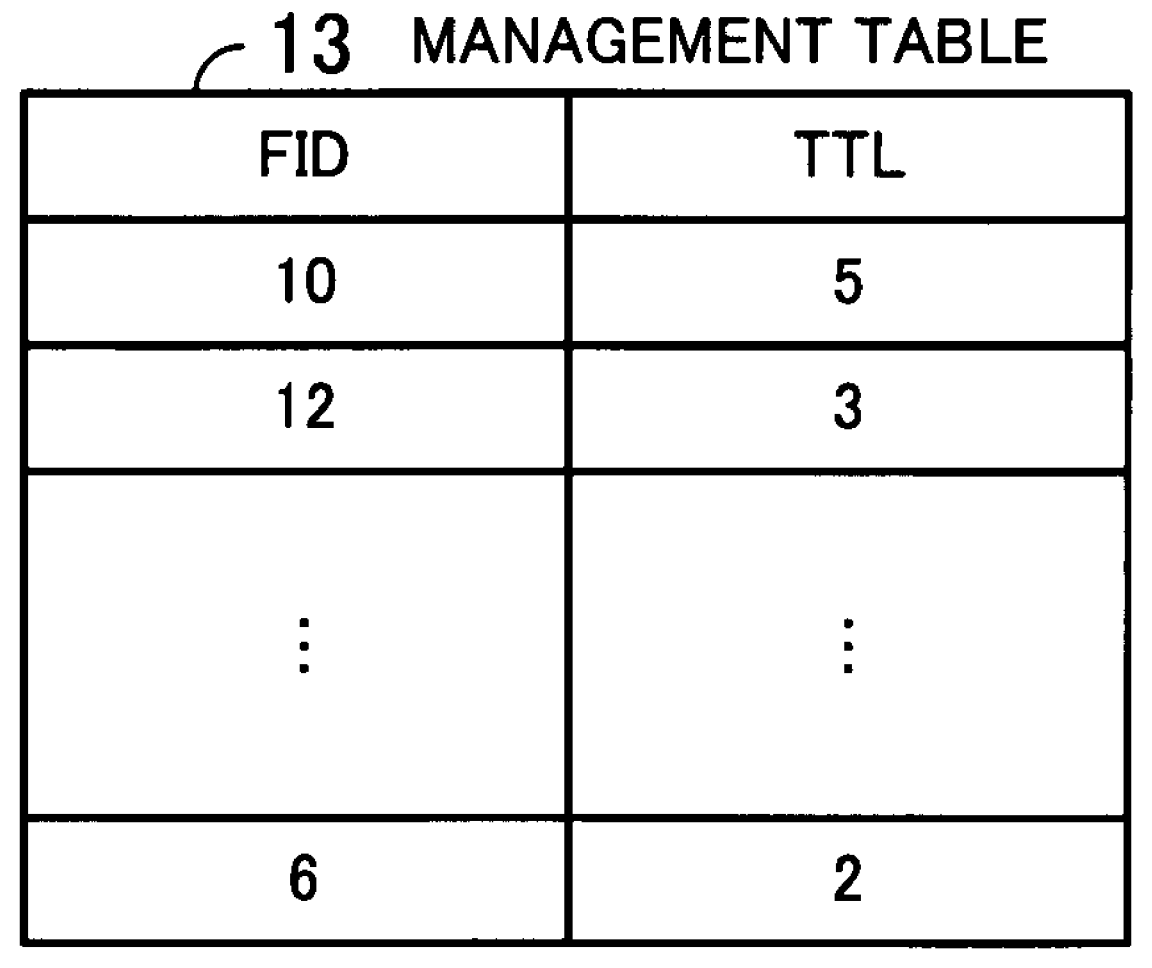

FIG. 6 shows an exemplary data structure of the management table. As illustrated, the management table 13 has an "FID" column storing frame identifiers and a "TTL" column storing TTL values. In the management table 13, the FID and TTL fields in each horizontal row are associated with each other, and thus, the frame identifier of a received frame and its corresponding TTL decremented by "1" are stored in a manner associated with each other.

The management table 13 can hold up to n frame identifier-TTL pairs, and a new pair of data is written over the oldest pair of data. Specifically, the frame identifier and its corresponding TTL of a new frame received by the frame receiver 11 are stored in the management table 13, while the frame identifier and its corresponding TTL of the oldest frame which has ceased to be exchanged among the wireless terminals 10 and 21 to 23 are deleted.

Referring again to FIG. 4, explanation will be continued. In cases where the wireless terminal 10 is neither the originating terminal nor the last terminal, the frame transmitter 14 forwards the frame, which has been received by the frame receiver 11 and of which the TTL has been decremented by "1" by the frame manager 12, to the succeeding wireless terminal. Where the wireless terminal 10 is the originating terminal, the frame transmitter transmits the generated frame after affixing thereto a unique frame identifier and a TTL value set taking account of the number of wireless terminals that are to relay the frame. On the other hand, where the wireless terminal 10 is the last terminal, after a frame is received from the preceding terminal by the frame receiver 11, the frame transmitter transmits, to the preceding terminal, a response frame indicating that the frame has been received.

The transmitted frame receiver 15 receives the frame which the succeeding wireless terminal forwards to the farther wireless terminal after receiving the frame from the frame transmitter 14. In the example shown in FIG. 2, when the wireless terminal 21 forwards the frame, which has been received from the wireless terminal 10, to the succeeding wireless terminal 22, the transmitted frame receiver 15 receives the forwarded frame. The wireless terminals 10 and 21 are connected to each other by a two-way link, and therefore, the transmitted frame receiver 15 can receive the frame forwarded by the wireless terminal 21.

The identifier comparator 16 determines whether or not the frame identifier included in the frame received by the transmitted frame receiver 15 agrees with any of the frame identifiers stored in the management table 13.

If a matching frame identifier is found by the identifier comparator 16, the frame reception recognizer 17 recognizes that the frame has been normally received by the succeeding wireless terminal. Namely, the frame identifier of the frame transmitted from the frame transmitter 14 to the succeeding wireless terminal is stored in the management table 13, and accordingly, if the frame identifier of the frame forwarded by the succeeding wireless terminal agrees with any of the frame identifiers in the management table 13, then it means that the frame transmitted from the frame transmitter 14 has been normally received by the succeeding wireless terminal. On the other hand, if no matching frame identifier is found by the identifier comparator 16, for example, if a frame with a frame identifier identical with one stored in the management table 13 is not received within a predetermined time, the frame reception recognizer judges that the frame is not received by the succeeding wireless terminal. When the response frame is received by the transmitted frame receiver 15, the frame reception recognizer judges that the frame has been normally received by the succeeding wireless terminal.

The frame transmission decision unit 18 acquires the frame identifier and the TTL from the frame received by the transmitted frame receiver 15, and also acquires the TTL corresponding to the acquired frame identifier from the management table 13. Then, the frame transmission decision unit 18 compares the TTL acquired from the frame received by the transmitted frame receiver 15 with the TTL acquired from the management table 13, to determine the wireless terminal that transmitted the frame received by the transmitted frame receiver 15. Namely, the TTL is decremented by "1" each time the frame is relayed by a wireless terminal, and therefore, if the TTL of the frame received by the transmitted frame receiver 15 is smaller by "1" than the corresponding TTL stored in the management table, it can be concluded that the frame has been received from the succeeding wireless terminal. If the TTL is smaller by "2" than the corresponding TTL, it is judged that the frame has been received from the wireless terminal following the succeeding terminal.

An example of frame transfer routing will be now described.

Figure 7:
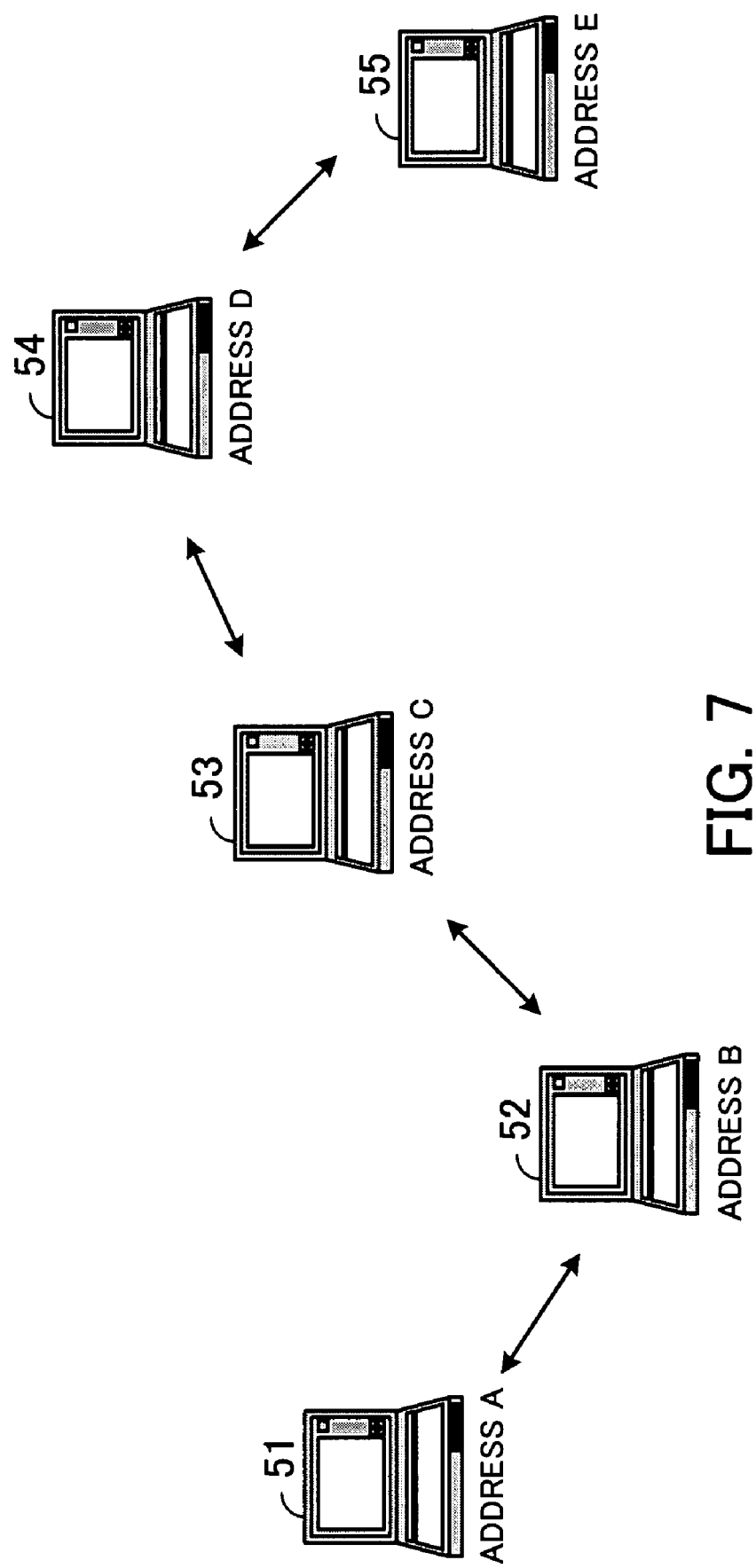
FIG. 7 illustrates exemplary routing for a frame transfer path.

FIG. 7 illustrates exemplary routing for a frame transfer path, wherein a route for exchanging frames between wireless terminals 51 and 55 is searched. The wireless terminals 51 to 55 have addresses A to E assigned thereto, respectively.

First, the wireless terminal 51 sets "1" for all bits in the destination field of the local header 41 of the frame 40 shown in FIG. 5, thereby making the frame a broadcast frame. For the source, the local address A is set. Since a route between the wireless terminals 51 and 55 is to be searched, the addresses E and A of the wireless terminals 55 and 51 are set in the destination and source fields, respectively, of the global header 42. The wireless terminal 51 then broadcasts the frame 40 (hereinafter routing frame).

Suppose that the routing frame generated by the wireless terminal 51 is received by the wireless terminal 52. The wireless terminal 52 stores the source addresses (both address A) of the local and global headers in the routing frame received from the wireless terminal 51, in the management table (identical with the management table 13 explained above with reference to FIG. 4) or in memory such as the RAM or the HDD. Accordingly, when a frame whose global header specifies the address A as the destination is received from a different wireless terminal, the wireless terminal 52 can determine that the frame should be transmitted to the wireless terminal 51, by looking up the management table or the memory. After writing the local address B as the source of the local header in the routing frame received from the wireless terminal 51, the wireless terminal 52 broadcasts the routing frame.

Let it be assumed that the routing frame from the wireless terminal 52 is received by the wireless terminal 53. The wireless terminal 53 stores the source addresses (addresses B and A) of the local and global headers in the routing frame received from the wireless terminal 52, in the management table or in memory such as the RAM or the HDD. Thus, when a frame whose global header specifies the address A as the destination is received from a different wireless terminal, the wireless terminal 53 can determine that the frame should be transmitted to the wireless terminal 52 with the address B, by looking up the management table or the memory. The wireless terminal 53 writes its local address C as the source of the local header in the routing frame received from the wireless terminal 52, and then broadcasts the routing frame.

In the same manner as described above, the wireless terminals 53 and 54 also recognize that, when a frame whose global header specifies the address A as the destination is received from a different wireless terminal, the frame should be transmitted to the preceding wireless terminals 52 and 53, respectively, by looking up the management table or the memory.

Suppose that the routing frame from the wireless terminal 54 is received by the wireless terminal 55. The wireless terminal 55 stores the source addresses (addresses D and A) of the local and global headers in the routing frame received from the wireless terminal 54, in the management table or in memory such as the RAM or the HDD. Accordingly, when a frame whose destination is the address A is to be transmitted, the wireless terminal 55 can determine that the frame should be transmitted to the wireless terminal 54 with the address D, by looking up the management table or the memory.

The wireless terminal 55 generates a routing frame of which the local header specifies the address E as the source and of which the global header specifies the addresses A and E as the destination and the source, respectively. Then, the wireless terminal 55 broadcasts the generated routing frame.

Suppose that the routing frame generated by the wireless terminal 55 is received by the wireless terminal 54. The wireless terminal 54 stores the source addresses (both address E) of the local and global headers in the routing frame received from the wireless terminal 55, in the management table or in memory such as the RAM or the HDD. Accordingly, when a frame whose global header specifies the address E as the destination is received from a different wireless terminal, the wireless terminal 54 can determine that the frame should be transmitted to the wireless terminal 55 with the address E, by looking up the management table or the memory. After writing the local address D as the source of the local header in the routing frame received from the wireless terminal 55, the wireless terminal 54 broadcasts the routing frame.

Let it be assumed that the routing frame from the wireless terminal 54 is received by the wireless terminal 53. The wireless terminal 53 stores the source addresses (addresses D and E) of the local and global headers in the routing frame received from the wireless terminal 54, in the management table or in memory such as the RAM or the HDD. Thus, when a frame whose global header specifies the address E as the destination is received from a different wireless terminal, the wireless terminal 53 can determine that the frame should be transmitted to the wireless terminal 54 with the address D, by looking up the management table or the memory. The wireless terminal 53 writes its local address C as the source of the local header in the routing frame received from the wireless terminal 54, and then broadcasts the routing frame.

Following the same procedure as described above, the wireless terminals 52 and 51 also recognize that, when a frame whose global header specifies the address E as the destination is received from a different wireless terminal, the frame should be transmitted to the preceding wireless terminals 53 and 52, respectively, by looking up the management table or the memory.

In this manner, a route for exchanging frames between the wireless terminals 51 and 55 is determined. If a certain wireless terminal develops communication failure, the transfer route cannot be used any longer. In such cases, the transfer route is again searched so that communication can be performed via different wireless terminals operating normally.

Alternatively, an operative transfer route may be previously determined by human work so that frames may be exchanged via the determined route.

The following describes the operations of the wireless terminals 10 and 21 to 23 in FIG. 2, each having the function illustrated in FIG. 4.

Figure 8:
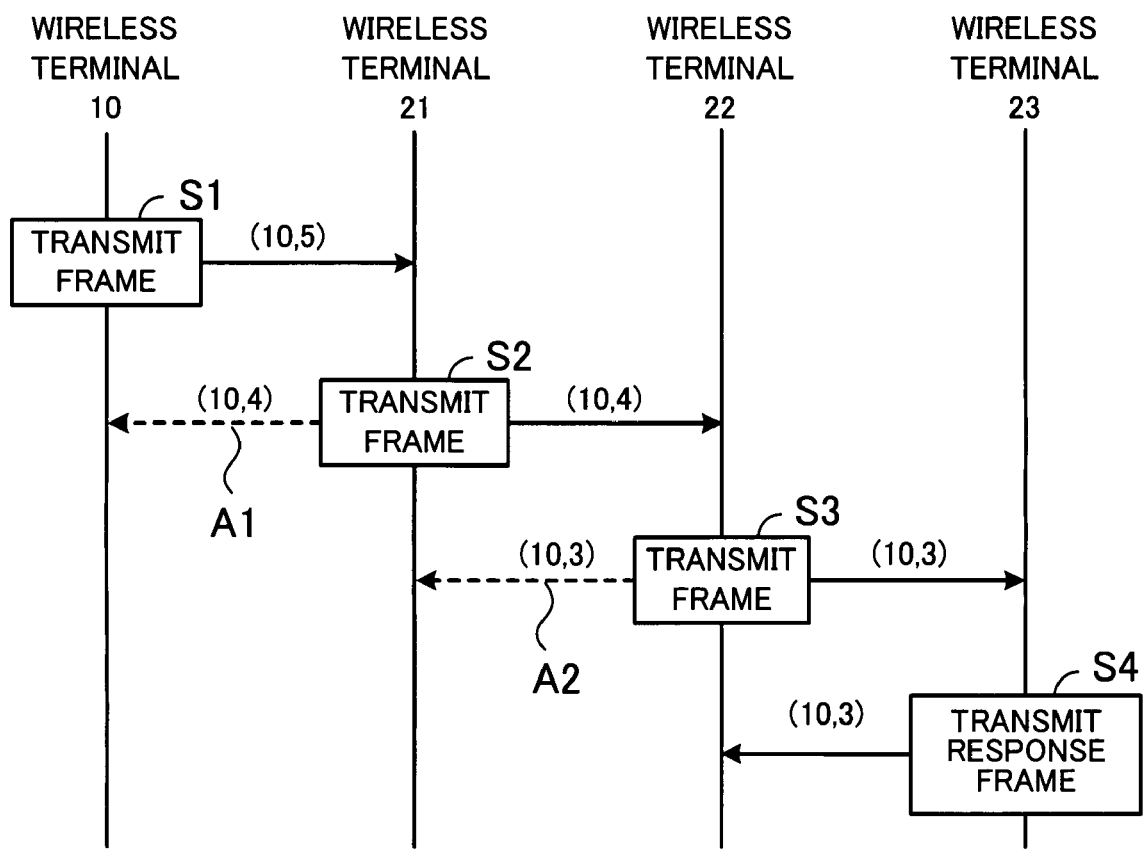
FIG. 8 is a sequence diagram illustrating operations of the wireless terminals shown in FIG. 2.

FIG. 8 is a sequence diagram illustrating the operations of the wireless terminals shown in FIG. 2, wherein data is transmitted from the wireless terminal 10 to the wireless terminal 23. In the figure, the left-hand number in parentheses indicates the frame identifier of a transmitted frame, and the right-hand number in parentheses indicates the TTL.

In Step S1, the frame transmitter 14 of the wireless terminal 10 generates a frame of data to be transmitted to the wireless terminal 23. Since the wireless terminal 10 is the originating terminal, the frame transmitter 14 assigns a unique frame identifier and TTL to the frame and stores the assigned frame identifier and TTL in the management table 13. Then, the frame transmitter 14 transmits the generated frame to the wireless terminal 21. In the following description, it is assumed that the frame identifier and TTL assigned at this time are "10" and "5", respectively.

In Step S2, the frame receiver of the wireless terminal 21 receives the frame from the wireless terminal 10. The frame manager of the wireless terminal 21 subtracts "1" from the TTL of the frame received by the frame receiver and stores the decremented TTL, along with the frame identifier "10", in the management table. The frame transmitter of the wireless terminal 21 transmits (forwards) to the wireless terminal 22 the frame whose frame identifier is left unchanged and thus is "10" and whose TTL has been decremented by "1" and thus is "4".

The frame transmitted from the wireless terminal 21 to the wireless terminal 22 also reaches the wireless terminal 10 (in FIG. 8, indicated by dashed arrow A1). The transmitted frame receiver 15 of the wireless terminal 10 monitors the ad-hoc network in search of the frame transmitted from the frame transmitter 14 and receives the frame transmitted from the wireless terminal 21.

The identifier comparator 16 of the wireless terminal 10 compares the frame identifier "10" of the frame received by the transmitted frame receiver 15 with those stored in the management table 13. The management table 13 of the wireless terminal 10 holds the frame identifier "10" stored in Step S1. Accordingly, the identifier comparator 16 finds the same frame identifier in the management table, and the frame reception recognizer 17 recognizes that the frame has been properly received by the wireless terminal 21. Also, on ascertaining that the TTL of the received frame has been decremented by "1", the frame transmission decision unit 18 of the wireless terminal 10 judges that the received frame was forwarded from the succeeding wireless terminal 21 to the farther terminal 22.

In Step S3, the frame receiver of the wireless terminal 22 receives the frame from the wireless terminal 21. The frame manager of the wireless terminal 22 subtracts "1" from the TTL of the frame received by the frame receiver and stores the decremented TTL, together with the frame identifier "10", in the management table. The frame transmitter of the wireless terminal 22 transmits to the wireless terminal 23 the frame whose frame identifier is left unchanged and thus is "10" and whose TTL has been decremented by "1" and thus is "3".

The frame forwarded from the wireless terminal 22 to the wireless terminal 23 also reaches the wireless terminal 21 (in FIG. 8, indicated by dashed arrow A2). The transmitted frame receiver of the wireless terminal 21 monitors the ad-hoc network in search of the frame transferred from the local terminal and receives the frame transmitted from the wireless terminal 22.

The identifier comparator of the wireless terminal 21 compares the frame identifier of the frame received by the transmitted frame receiver with those stored in the management table. The management table of the wireless terminal 21 holds the frame identifier "10" stored in Step S2. Accordingly, the identifier comparator finds the same frame identifier in the management table, and the frame reception recognizer recognizes that the frame has been properly received by the wireless terminal 22. Also, since the TTL of the received frame has been decremented by "1", the frame transmission decision unit of the wireless terminal 21 judges that the received frame was forwarded from the succeeding wireless terminal 22 to the farther wireless terminal 23.

In Step S4, the frame receiver of the wireless terminal 23 receives the frame from the wireless terminal 22. The frame manager of the wireless terminal 23 subtracts "1" from the TTL of the frame received by the frame receiver and stores the decremented TTL, together with the frame identifier "10", in the management table. The frame transmitter of the wireless terminal 23 recognizes that the received frame specifies the local terminal 23 as the last terminal. Accordingly, the frame transmitter does not forward the frame but transmits a response frame indicative of normal reception of the frame to the preceding wireless terminal 22. The response frame carries the same frame identifier and TTL as those of the received frame, that is, "10" and "3", respectively.

The transmitted frame receiver of the wireless terminal 22 monitors the ad-hoc network in search of the frame transferred from the local terminal and receives the response frame transmitted from the wireless terminal 23. On ascertaining that the response frame has been received from the wireless terminal 23, the frame reception recognizer of the wireless terminal 22 recognizes that the frame has been properly received by the wireless terminal 23. Also, since the TTL of the response frame is "3", the frame transmission decision unit of the wireless terminal 22 judges that the response frame is identical with the frame transmitted in Step S3.

In this manner, the frame transmitted from the succeeding wireless terminal is used as the response frame, whereby highly reliable connection-oriented communication can be established. Also, the data transfer efficiency can be improved and the traffic reduced.

A second embodiment of the present invention will be now described in detail with reference to the drawings. In the second embodiment, a wireless terminal transmits a frame to its succeeding wireless terminal, and if the frame forwarded by the succeeding wireless terminal is not received within a predetermined time, the wireless terminal retransmits the frame. The configuration of the ad-hoc network and the hardware configuration of each wireless terminal used in the second embodiment are respectively identical with those shown in FIGS. 2 and 3; therefore, description thereof is omitted.

Figure 9:
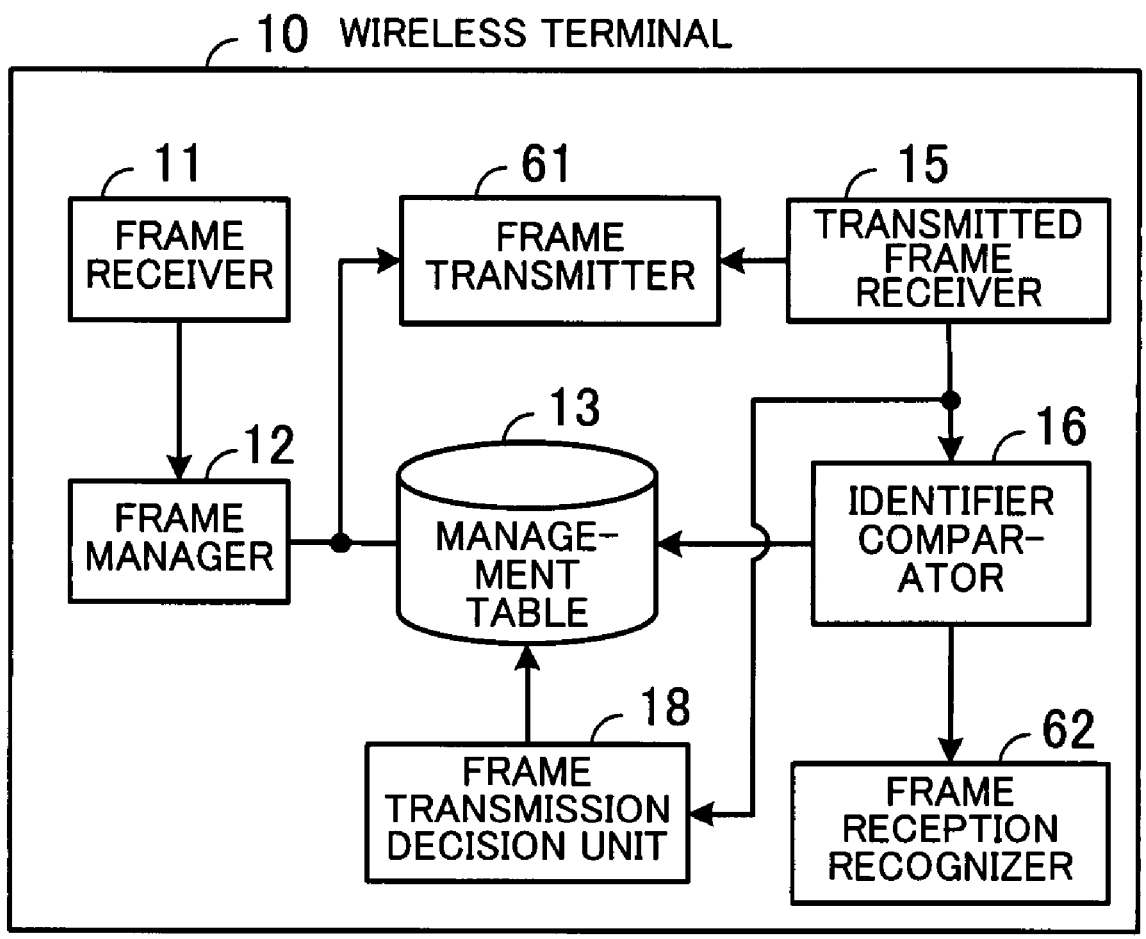
FIG. 9 is a functional block diagram of a wireless terminal according to a second embodiment.

FIG. 9 is a functional block diagram of a wireless terminal according to the second embodiment. In the figure, like reference numerals are used to denote like elements appearing in FIG. 4, and description of such elements is omitted.

A frame transmitter 61 transmits a frame to the succeeding wireless terminal, and if the transmitted frame receiver 15 fails to receive the frame from the succeeding wireless terminal within a predetermined time, the frame transmitter 61 retransmits the same frame. Also, if the frame receiver 11 receives a frame identical with one received before, the frame transmitter 61 transmits, to the preceding wireless terminal, a completion-of-transmission frame indicating that the frame has already been transmitted. Whether the frame receiver 11 has received the same frame or not can be determined by looking up the frame identifiers and TTL values stored in the management table 13.

When the completion-of-transmission frame is received by the transmitted frame receiver 15, a frame reception recognizer 62 recognizes that the frame has been properly received by the succeeding wireless terminal.

The following describes the operations of the wireless terminals 10 and 21 to 23 in FIG. 2, each having the function illustrated in FIG. 9.

Figure 10:
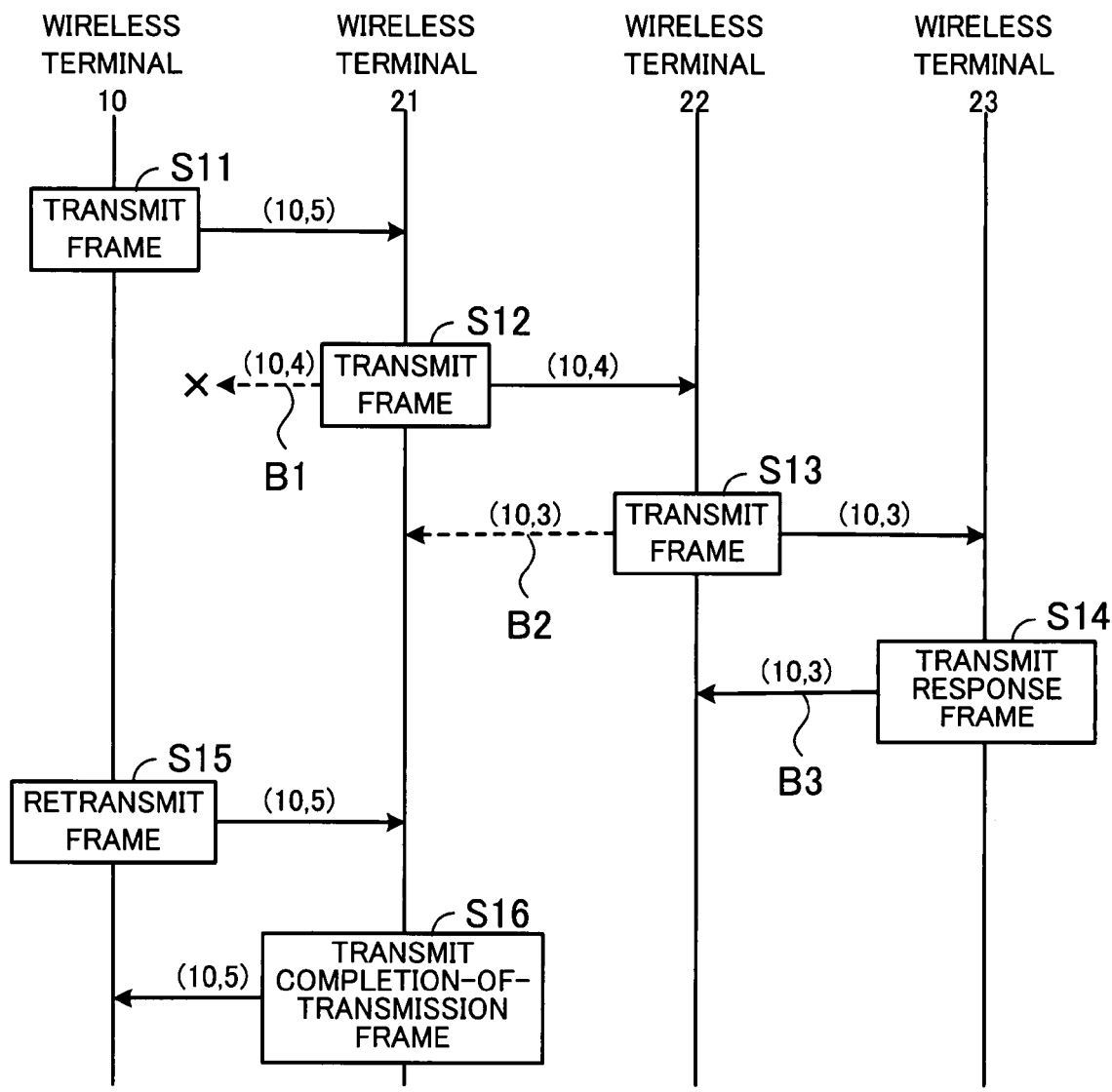
FIG. 10 is a sequence diagram illustrating operations of the wireless terminals shown in FIG. 2 but each with the function illustrated in FIG. 9.

FIG. 10 is a sequence diagram illustrating the operations of the wireless terminals shown in FIG. 2 and each having the function illustrated in FIG. 9, wherein data is transmitted from the wireless terminal 10 to the wireless terminal 23. In the figure, the left-hand number in parentheses indicates the frame identifier of a transmitted frame, and the right-hand number in parentheses indicates the TTL.

In Step S11, the frame transmitter 61 of the wireless terminal 10 generates a frame of data to be transmitted to the wireless terminal 23. At this time, the frame transmitter 61 assigns a unique frame identifier and TTL to the frame and stores the assigned frame identifier and TTL in the management table 13. Then, the frame transmitter 61 transmits the generated frame to the wireless terminal 21. In the following description, it is assumed that the frame identifier and TTL assigned at this time are "10" and "5", respectively.

In Step S12, the frame receiver of the wireless terminal 21 receives the frame from the wireless terminal 10. The frame manager of the wireless terminal 21 subtracts "1" from the TTL of the frame received by the frame receiver and stores the decremented TTL, along with the frame identifier "10", in the management table. The frame transmitter of the wireless terminal 21 transmits (forwards) to the wireless terminal 22 the frame whose frame identifier is left unchanged and thus is "10" and whose TTL has been decremented by "1" and thus is "4".

The frame transmitted from the wireless terminal 21 to the wireless terminal 22 should reach the wireless terminal 10 as well, but it is assumed here that because of some fault, the frame fails to reach the wireless terminal 10 (in FIG. 10, indicated by dashed arrow B1).

In Step S13, the frame receiver of the wireless terminal 22 receives the frame from the wireless terminal 21. The frame manager of the wireless terminal 22 subtracts "1" from the TTL of the frame received by the frame receiver and stores the decremented TTL, together with the frame identifier "10", in the management table. The frame transmitter of the wireless terminal 22 transmits to the wireless terminal 23 the frame whose frame identifier is left unchanged and thus is "10" and whose TTL has been decremented by "1" and thus is "3".

The frame forwarded from the wireless terminal 22 to the wireless terminal 23 also reaches the wireless terminal 21 (in FIG. 10, indicated by dashed arrow B2). The transmitted frame receiver of the wireless terminal 21 monitors the ad-hoc network in search of the frame transferred from the local terminal and receives the frame transmitted from the wireless terminal 22.

The identifier comparator of the wireless terminal 21 compares the frame identifier of the frame received by the transmitted frame receiver with those stored in the management table. The management table of the wireless terminal 21 holds the frame identifier "10" stored in Step S12. Accordingly, the identifier comparator finds the same frame identifier in the management table, and the frame reception recognizer recognizes that the frame has been properly received by the wireless terminal 22. Also, since the TTL of the received frame has been decremented by "1", the frame transmission decision unit of the wireless terminal 21 judges that the received frame was forwarded from the succeeding wireless terminal 22 to the farther wireless terminal 23.

In Step S14, the frame receiver of the wireless terminal 23 receives the frame from the wireless terminal 22. The frame manager of the wireless terminal 23 subtracts "1" from the TTL of the frame received by the frame receiver and stores the decremented TTL, together with the frame identifier "10", in the management table. The frame transmitter of the wireless terminal 23 recognizes that the received frame specifies the local terminal 23 as the last terminal. Accordingly, the frame transmitter does not forward the frame but transmits a response frame indicative of normal reception of the frame to the preceding wireless terminal 22. The response frame carries the same frame identifier and TTL as those of the received frame, that is, "10" and "3", respectively.

The transmitted frame receiver of the wireless terminal 22 monitors the ad-hoc network in search of the frame transferred from the local terminal and receives the response frame transmitted from the wireless terminal 23. On ascertaining that the response frame has been received from the wireless terminal 23, the frame reception recognizer of the wireless terminal 22 recognizes that the frame has been properly received by the wireless terminal 23. Also, since the TTL of the response frame is "3", the frame transmission decision unit judges that the response frame is identical with the frame transmitted in Step S13.

Although the frame was transmitted from the wireless terminal 10 to the wireless terminal 21, the frame from the wireless terminal 21 does not reach the transmitted frame receiver 15 within the predetermined time. Accordingly, in Step S15, the frame transmitter 61 retransmits the same frame (frame identifier: 10; TTL: 5) as that transmitted in Step S11.

In Step S16, the frame receiver of the wireless terminal 21 receives the frame with the frame identifier "10" and the TTL "5" from the wireless terminal 10. The frame manager of the wireless terminal 21 subtracts "1" from the TTL of the received frame. The frame identifier of the received frame and the TTL obtained by decrementing "1" from the TTL of the received frame are already stored in the management table in Step S12. Accordingly, it is judged that the received frame is identical with one received before, and the frame transmitter transmits, to the wireless terminal 10, a completion-of-transmission frame indicating that the received frame has already been transmitted.

The transmitted frame receiver 15 of the wireless terminal 10 receives the completion-of-transmission frame from the wireless terminal 21. Since the completion-of-transmission frame is received by the transmitted frame receiver 15, the frame reception recognizer 62 of the wireless terminal 10 recognizes that the frame has been properly received by the succeeding wireless terminal 21.

In this manner, each wireless terminal retransmits the frame if it is unable to ascertain that the frame has been properly received by the succeeding wireless terminal. If the frame has been properly received, the succeeding wireless terminal sends a completion-of-transmission frame back to the wireless terminal, whereby highly reliable connection-oriented communication can be established. Also, the data transfer efficiency can be improved and the traffic reduced.

A third embodiment of the present invention will be now described in detail with reference to the drawings. In the third embodiment, even if a wireless terminal is unable to receive a frame transmitted (forwarded) by the succeeding wireless terminal, it recognizes that the frame has been properly received by the succeeding wireless terminal, upon receiving a response frame from the last wireless terminal with which the wireless terminal is connected by a two-way link. The hardware configuration and functional blocks of each wireless terminal used in the third embodiment are respectively identical with those shown in FIGS. 3 and 4; therefore, description thereof is omitted.

Figure 11:
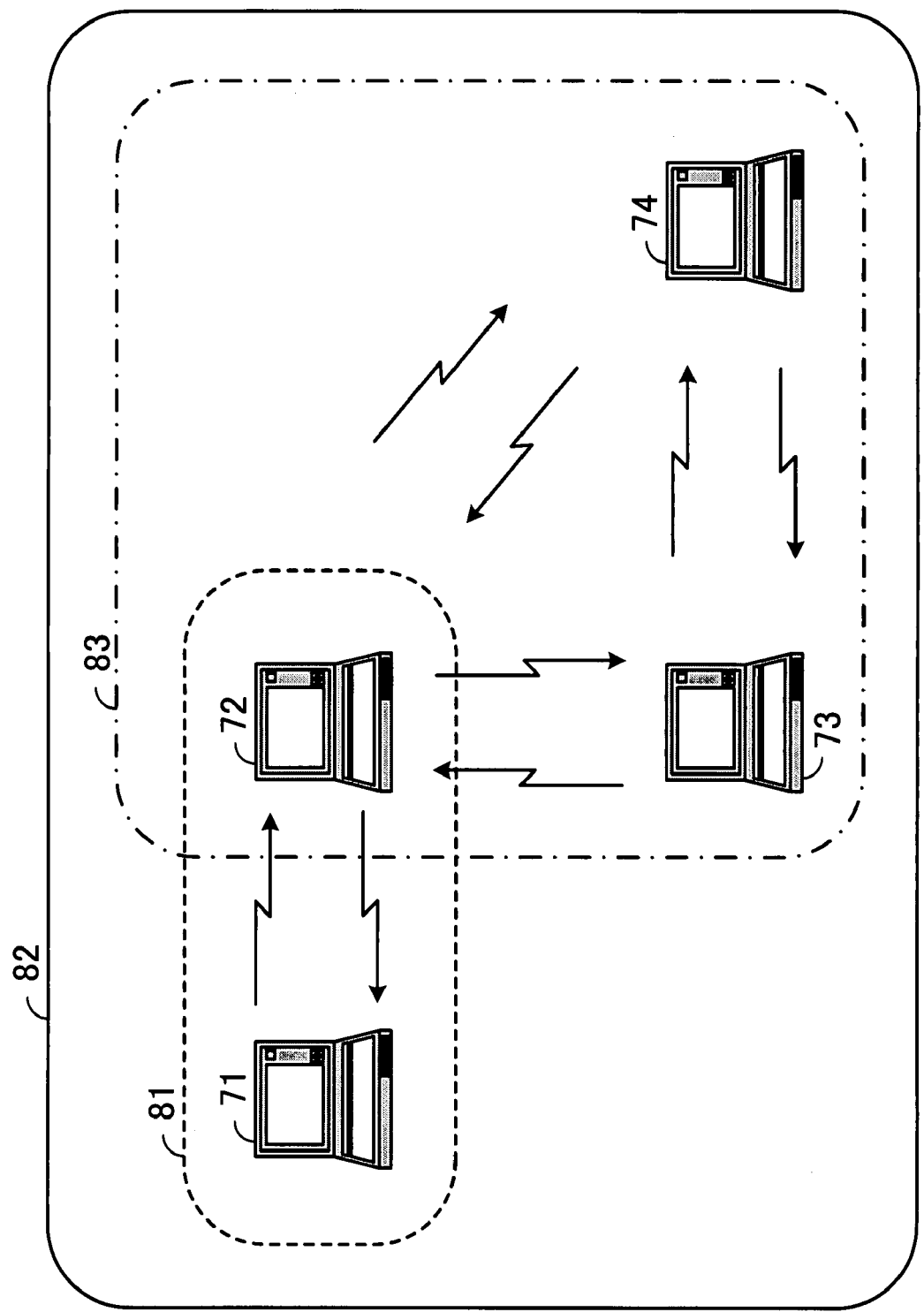
FIG. 11 shows an exemplary configuration of an ad-hoc network constituted by wireless terminals according to a third embodiment.

FIG. 11 shows an exemplary configuration of an ad-hoc network constituted by wireless terminals according to the third embodiment. As illustrated, the wireless terminals 71 to 74 constitute an ad-hoc network. A radio coverage area 81 indicates an area where radio waves from the wireless terminal 71 can reach, and thus radio waves from the wireless terminal 71 reach the wireless terminal 72. A radio coverage area 82 indicates an area where radio waves from the wireless terminal 72 can reach; therefore, radio waves from the wireless terminal 72 reach the wireless terminals 71, 73 and 74. A radio coverage area 83 indicates an area where radio waves from the wireless terminals 73 and 74 can reach. Accordingly, radio waves from the wireless terminal 73 reach the wireless terminals 72 and 74, and radio waves from the wireless terminal 74 reach the wireless terminals 72 and 73. The wireless terminals 71 and 72, the wireless terminals 72 and 73, the wireless terminals 72 and 74, and the wireless terminals 73 and 74 are individually interconnected by a two-way link.

Suppose that data is transmitted from the wireless terminal 71 to the wireless terminal 74 and that the data transfer route is already determined by means of the routing frame such that the data is forwarded from the wireless terminal 72 to the wireless terminal 73.

The following describes the operations of the wireless terminals 71 to 74 in FIG. 11, each having the function illustrated in FIG. 4.

Figure 12:
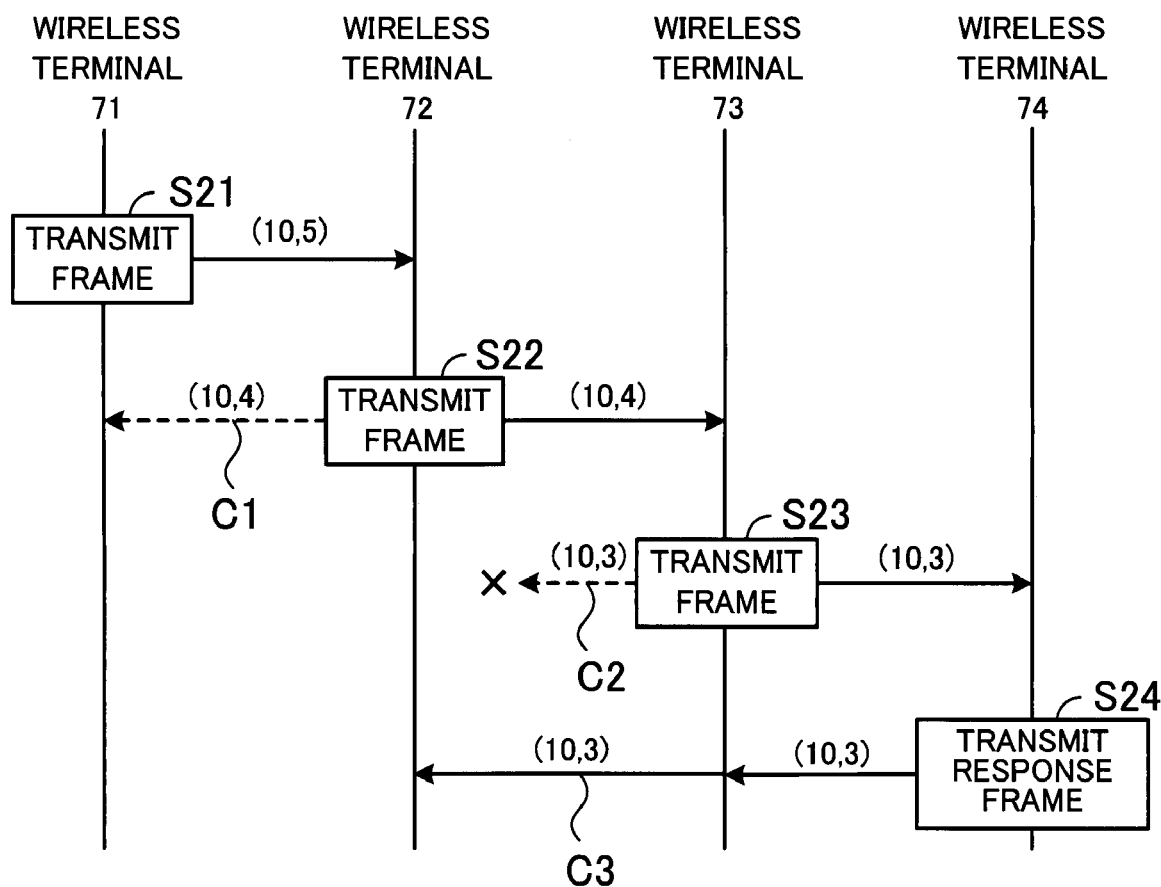
FIG. 12 is a sequence diagram illustrating operations of the wireless terminals shown in FIG. 11.

FIG. 12 is a sequence diagram illustrating the operations of the wireless terminals shown in FIG. 11. In the figure, the left-hand number in parentheses indicates the frame identifier of a transmitted frame, and the right-hand number in parentheses indicates the TTL.

In Step S21, the frame transmitter of the wireless terminal 71 generates a frame of data to be transmitted to the wireless terminal 74. At this time, the frame transmitter assigns a unique frame identifier and TTL to the frame and stores the assigned frame identifier and TTL in the management table. Then, the frame transmitter transmits the generated frame to the wireless terminal 72. In the following description, it is assumed that the frame identifier and TTL assigned at this time are "10" and "5", respectively.

In Step S22, the frame receiver of the wireless terminal 72 receives the frame from the wireless terminal 71. The frame manager of the wireless terminal 72 subtracts "1" from the TTL of the frame received by the frame receiver and stores the decremented TTL, along with the frame identifier "10", in the management table. The frame transmitter of the wireless terminal 72 transmits (forwards) to the wireless terminal 73 the frame whose frame identifier is left unchanged and thus is "10" and whose TTL has been decremented by "1" and thus is "4".

The frame transmitted from the wireless terminal 72 to the wireless terminal 73 also reaches the wireless terminal 71 (in FIG. 12, indicated by dashed arrow C1). The transmitted frame receiver of the wireless terminal 71 monitors the ad-hoc network in search of the frame transmitted from the local terminal and receives the frame transmitted from the wireless terminal 72.

The identifier comparator of the wireless terminal 71 compares the frame identifier "10" of the frame received by the transmitted frame receiver with those stored in the management table. The management table of the wireless terminal 71 holds the frame identifier "10" stored in Step S21. Accordingly, the identifier comparator finds the same frame identifier in the management table, and the frame reception recognizer recognizes that the frame has been properly received by the wireless terminal 72. Also, since the TTL of the received frame has been decremented by "1", the frame transmission decision unit of the wireless terminal 71 judges that the received frame was forwarded from the succeeding wireless terminal 72 to the farther wireless terminal 73.

In Step S23, the frame receiver of the wireless terminal 73 receives the frame from the wireless terminal 72. The frame manager of the wireless terminal 73 subtracts "1" from the TTL of the frame received by the frame receiver and stores the decremented TTL, together with the frame identifier "10", in the management table. The frame transmitter of the wireless terminal 73 transmits to the wireless terminal 74 the frame whose frame identifier is left unchanged and thus is "10" and whose TTL has been decremented by "1" and thus is "3".

The frame forwarded from the wireless terminal 73 to the wireless terminal 74 should reach the wireless terminal 72 as well, but it is assumed here that because of some fault, the frame fails to reach the wireless terminal 72 (in FIG. 12, indicated by dashed arrow C2).

In Step S24, the frame receiver of the wireless terminal 74 receives the frame from the wireless terminal 73. The frame manager of the wireless terminal 74 subtracts "1" from the TTL of the frame received by the frame receiver and stores the decremented TTL, together with the frame identifier "10", in the management table. The frame transmitter of the wireless terminal 74 recognizes that the received frame specifies the local terminal 74 as the last terminal. Accordingly, the frame transmitter does not forward the frame but transmits a response frame indicative of normal reception of the frame to the preceding wireless terminal 73. The response frame carries the same frame identifier and TTL as those of the received frame, that is, "10" and "3", respectively.

The transmitted frame receiver of the wireless terminal 73 monitors the ad-hoc network in search of the frame transferred from the local terminal and receives the response frame transmitted from the wireless terminal 74. On ascertaining that the response frame has been received from the wireless terminal 74, the frame reception recognizer of the wireless terminal 73 recognizes that the frame has been properly received by the wireless terminal 74. Also, since the TTL of the response frame is "3", the frame transmission decision unit of the wireless terminal 73 judges that the wireless terminal 74 has received the frame transmitted in Step S23.

The transmitted frame receiver of the wireless terminal 72 monitors the network in search of the frame transmitted from the wireless network 73 but is unable to receive the frame because of fault (in FIG. 12, indicated by dashed arrow C2). Consequently, the wireless terminal 72 is unable to determine whether the frame has been properly received by the wireless terminal 73 or not. The wireless terminal 72 is, however, connected to the wireless terminal 74 by a two-way link and can receive the response frame transmitted from the wireless terminal 74 (in FIG. 12, indicated by arrow C3). When the response frame from the wireless terminal 74 is received by the transmitted frame receiver, the frame reception recognizer of the wireless terminal 72 judges that the frame could be properly transmitted to the wireless terminal 73.

In this manner, where a wireless terminal is connected with the last wireless terminal by a two-way link, it can receive a response frame from the last wireless terminal and thus can judge that the frame transmitted therefrom has been properly received by the succeeding wireless terminal, even if it is unable to receive the frame transmitted from the succeeding wireless terminal. Consequently, highly reliable connection-oriented communication can be established, and also the data transfer efficiency can be improved with the traffic reduced. Moreover, the last wireless terminal has only to transmit a response frame and it is unnecessary to retransmit a frame or to transmit a completion-of-transmission frame, making it possible to further improve the data transfer efficiency and reduce the traffic.

A fourth embodiment of the present invention will be now described in detail with reference to the drawings. In the fourth embodiment, even if a wireless terminal is unable to receive a frame transmitted (forwarded) from the succeeding wireless terminal, it recognizes that the frame has been properly received by the succeeding wireless terminal, upon receiving a frame from a farther wireless terminal which follows the succeeding wireless terminal and with which the wireless terminal is connected by a two-way link. The hardware configuration and functional blocks of each wireless terminal used in the fourth embodiment are respectively identical with those shown in FIGS. 3 and 4; therefore, description thereof is omitted.

Figure 13:
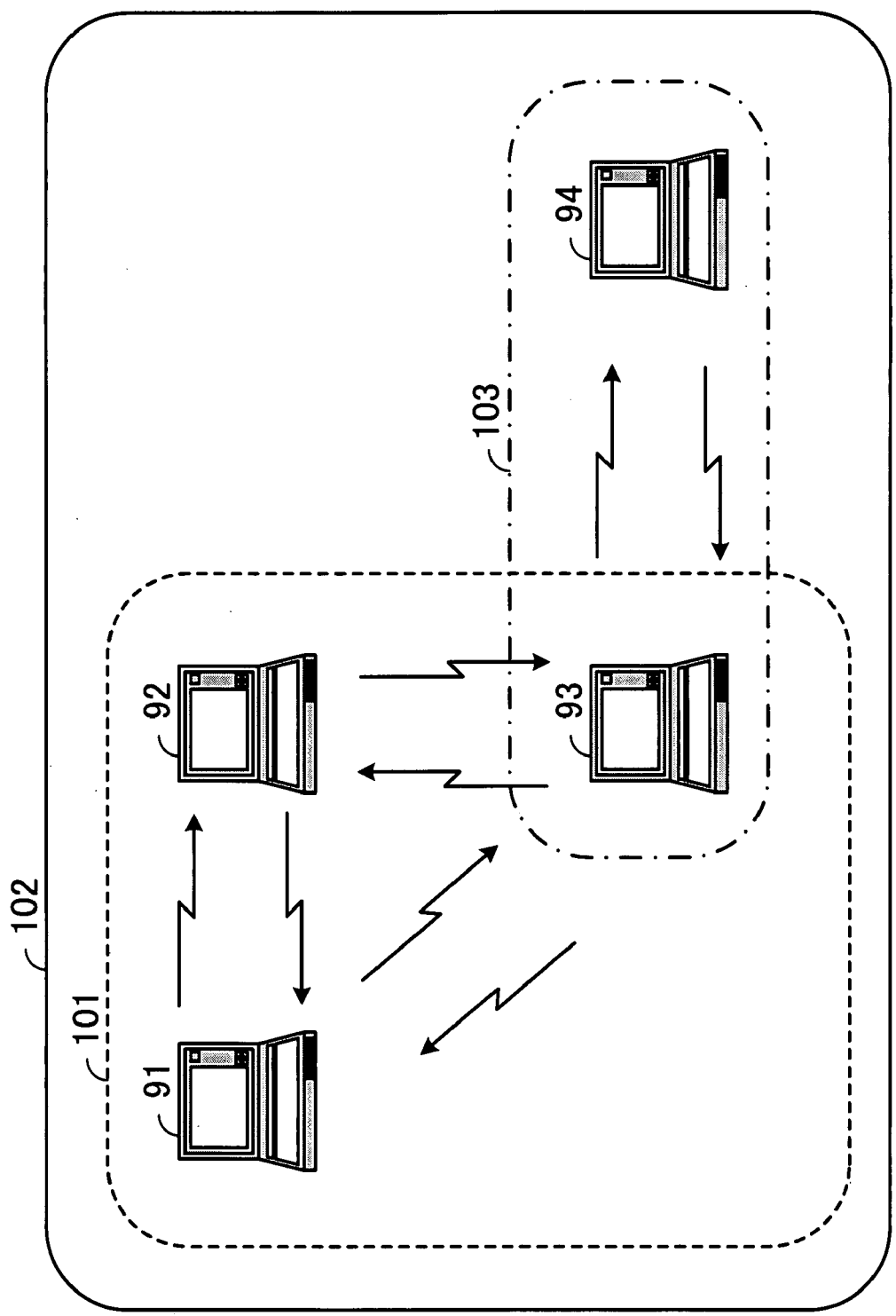
FIG. 13 shows an exemplary configuration of an ad-hoc network constituted by wireless terminals according to a fourth embodiment.

FIG. 13 shows an exemplary configuration of an ad-hoc network constituted by wireless terminals according to the fourth embodiment. As illustrated, the wireless terminals 91 to 94 constitute an ad-hoc network. A radio coverage area 101 indicates an area where radio waves from the wireless terminals 91 and 92 can reach. Accordingly, radio waves from the wireless terminal 91 reach the wireless terminals 92 and 93, and radio waves from the wireless terminal 92 reach the wireless terminals 91 and 93. A radio coverage area 102 indicates an area where radio waves from the wireless terminal 93 can reach; therefore, radio waves from the wireless terminal 93 reach the wireless terminals 91, 92 and 94. A radio coverage area 103 indicates an area where radio waves from the wireless terminal 94 can reach, and thus radio waves from the wireless terminal 94 reach the wireless terminal 93. The wireless terminals 91 and 92, the wireless terminals 92 and 93, the wireless terminals 93 and 94, and the wireless terminals 91 and 93 are individually interconnected by a two-way link.

Suppose that data is transmitted from the wireless terminal 91 to the wireless terminal 94 and that the data transfer route is already determined by means of the routing frame such that the data is forwarded from the wireless terminal 92 to the wireless terminal 93.

The following describes the operations of the wireless terminals 91 to 94 in FIG. 13, each having the function illustrated in FIG. 4.

Figure 14:
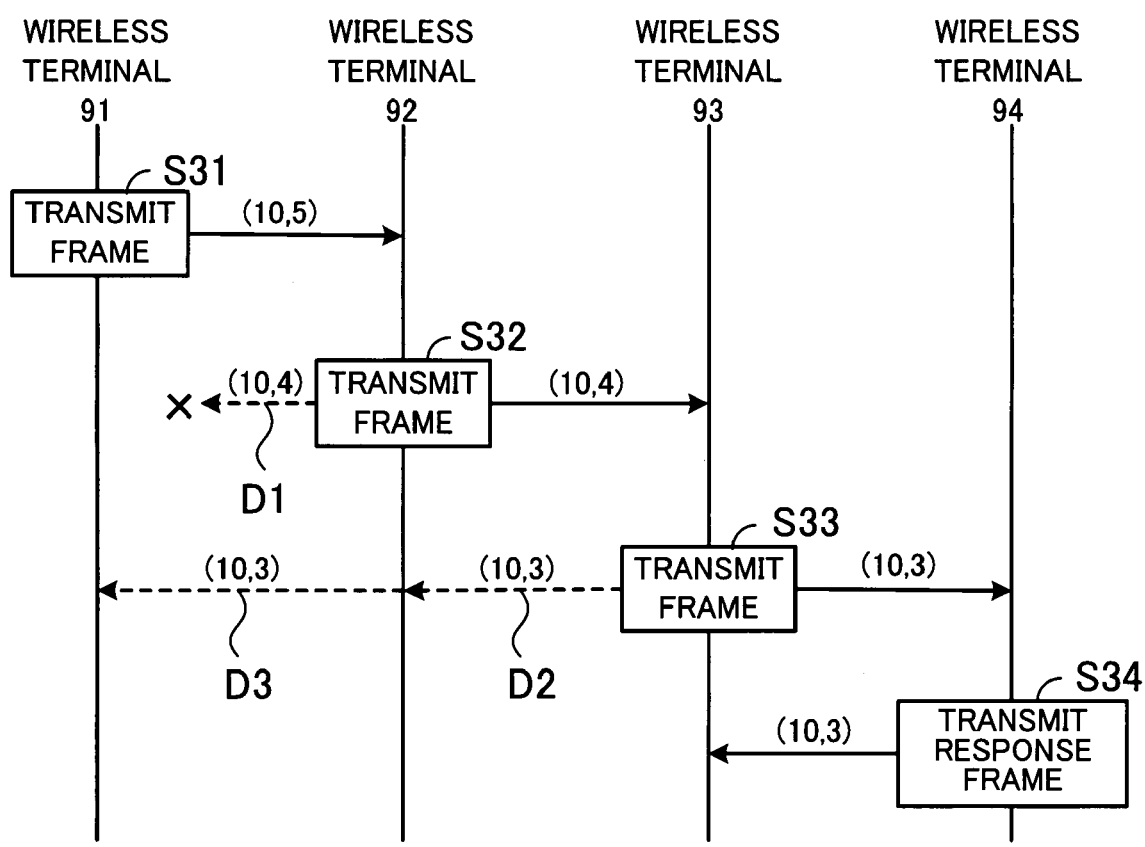
FIG. 14 is a sequence diagram illustrating operations of the wireless terminals shown in FIG. 13.
Figure 15:
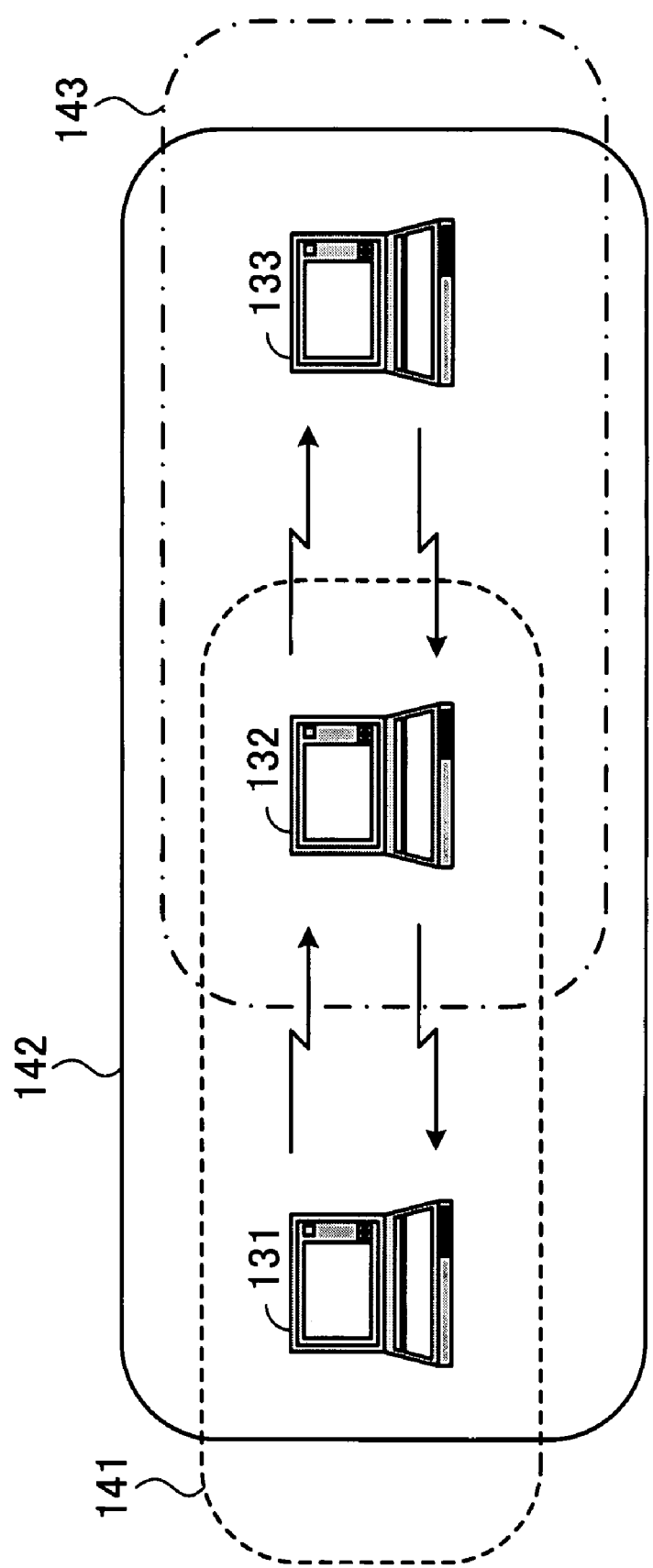
FIG. 15 illustrates radio coverage areas of wireless terminals.
Figure 16:
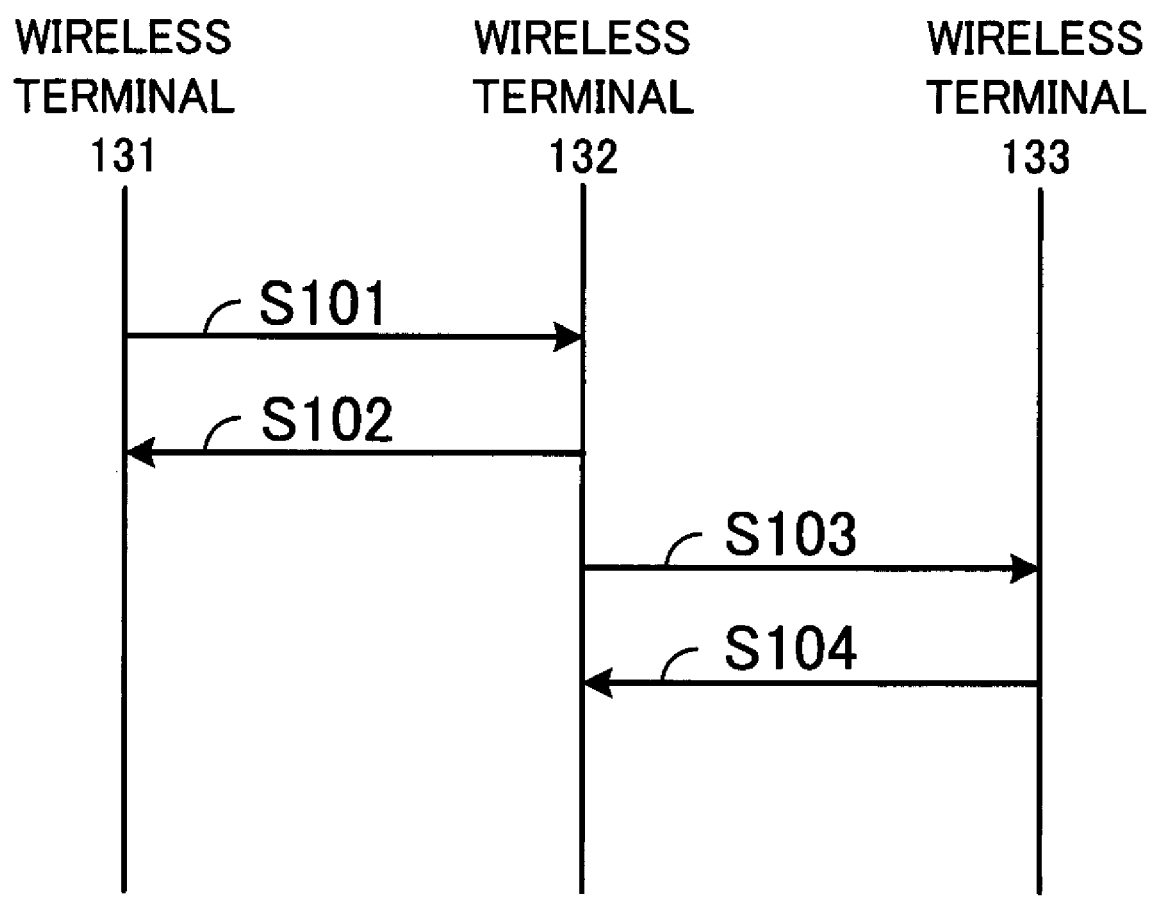
FIG. 16 is a sequence diagram illustrating operations of the wireless terminals shown in FIG. 15.

FIG. 14 is a sequence diagram illustrating the operations of the wireless terminals shown in FIG. 13. In the figure, the left-hand number in parentheses indicates the frame identifier of a transmitted frame, and the right-hand number in parentheses indicates the TTL.

In Step S31, the frame transmitter of the wireless terminal 91 generates a frame of data to be transmitted to the wireless terminal 94. At this time, the frame transmitter assigns a unique frame identifier and TTL to the frame and stores the assigned frame identifier and TTL in the management table. Then, the frame transmitter transmits the generated frame to the wireless terminal 92. In the following description, it is assumed that the frame identifier and TTL assigned at this time are "10" and "5", respectively.

In Step S32, the frame receiver of the wireless terminal 92 receives the frame from the wireless terminal 91. The frame manager of the wireless terminal 92 subtracts "1" from the TTL of the frame received by the frame receiver and stores the decremented TTL, along with the frame identifier "10", in the management table. The frame transmitter of the wireless terminal 92 transmits (forwards) to the wireless terminal 93 the frame whose frame identifier is left unchanged and thus is "10" and whose TTL has been decremented by "1" and thus is "4".

The frame transmitted from the wireless terminal 92 to the wireless terminal 93 should reach the wireless terminal 91 as well, but it is assumed here that because of some fault, the frame fails to reach the wireless terminal 91 (in FIG. 14, indicated by dashed arrow D1).

In Step S33, the frame receiver of the wireless terminal 93 receives the frame from the wireless terminal 92. The frame manager of the wireless terminal 93 subtracts "1" from the TTL of the frame received by the frame receiver and stores the decremented TTL, together with the frame identifier "10", in the management table. The frame transmitter of the wireless terminal 93 transmits to the wireless terminal 94 the frame whose frame identifier is left unchanged and thus is "10" and whose TTL has been decremented by "1" and thus is "3".

The frame forwarded from the wireless terminal 93 to the wireless terminal 94 also reaches the wireless terminal 92 (in FIG. 14, indicated by dashed arrow D2). The transmitted frame receiver of the wireless terminal 92 monitors the ad-hoc network in search of the transmitted frame and receives the frame transmitted from the wireless terminal 93.

The identifier comparator of the wireless terminal 92 compares the frame identifier "10" of the frame received by the transmitted frame receiver with those stored in the management table. The management table of the wireless terminal 92 holds the frame identifier "10" stored in Step S32. Accordingly, the identifier comparator finds the same frame identifier in the management table, and the frame reception recognizer recognizes that the frame has been properly received by the wireless terminal 93. Also, since the TTL of the received frame has been decremented by "1", the frame transmission decision unit of the wireless terminal 92 judges that the received frame was forwarded from the succeeding wireless terminal 93 to the farther wireless terminal 94.

The transmitted frame receiver of the wireless terminal 91 monitors the network in search of the frame transmitted from the wireless network 92 but is unable to receive the frame because of fault (in FIG. 14, indicated by dashed arrow D1). Consequently, the wireless terminal 91 is unable to determine whether the frame has been properly received by the wireless terminal 92 or not. The wireless terminal 91 is, however, connected to the wireless terminal 93 by a two-way link and can receive the frame transmitted from the wireless terminal 93 to the wireless terminal 94 (in FIG. 14, indicated by arrow D3). When the frame from the wireless terminal 93 is received by the transmitted frame receiver, the frame reception recognizer of the wireless terminal 91 judges that the frame has been properly received by the wireless terminal 92. Also, since the TTL of the received frame has been decremented by "2", the frame transmission decision unit of the wireless terminal 91 judges that the received frame was forwarded from the wireless terminal 93 to the wireless terminal 94. Namely, by receiving the frame forwarded from the wireless terminal 93, the wireless terminal 91 recognizes that the frame has been properly received by the wireless terminal 92.

In Step S34, the frame receiver of the wireless terminal 94 receives the frame from the wireless terminal 93. The frame manager of the wireless terminal 94 subtracts "1" from the TTL of the frame received by the frame receiver and stores the decremented TTL, together with the frame identifier "10", in the management table. The frame transmitter of the wireless terminal 94 recognizes that the received frame specifies the local terminal 94 as the last terminal. Accordingly, the frame transmitter does not forward the frame but transmits a response frame indicative of normal reception of the frame to the preceding wireless terminal 93. The response frame carries the same frame identifier and TTL as those of the received frame, that is, "10" and "3", respectively.

The transmitted frame receiver of the wireless terminal 93 monitors the ad-hoc network in search of the forwarded frame and receives the response frame transmitted from the wireless terminal 94. On ascertaining that the response frame has been received from the wireless terminal 94, the frame reception recognizer of the wireless terminal 93 recognizes that the frame has been properly received by the wireless terminal 94. Also, since the TTL of the response frame is "3", the frame transmission decision unit of the wireless terminal 93 judges that the received frame is identical with the frame transmitted in Step S33.

In this manner, where a wireless terminal is connected with a farther wireless terminal by a two-way link, it can receive a frame from the farther wireless terminal and thus can judge that the frame transmitted therefrom has been properly received by the succeeding wireless terminal, even if it is unable to receive the frame from the succeeding wireless terminal. Consequently, highly reliable connection-oriented communication can be realized, and also the data transfer efficiency can be improved with the traffic reduced. Moreover, the wireless terminal has only to receive a frame from the farther terminal and it is unnecessary to retransmit the frame or to transmit a completion-of-transmission frame, making it possible to further improve the data transfer efficiency and reduce the traffic.

The wireless terminal of the present invention receives the frame transmitted from the succeeding wireless terminal to a farther wireless terminal and, on receiving the frame, recognizes that the frame has been received by the succeeding wireless terminal. It is therefore unnecessary for the wireless terminal to receive from the succeeding wireless terminal a response frame indicative of reception of the frame, thus improving data transfer efficiency and reducing traffic.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A wireless terminal constituting an ad-hoc network to perform communication, comprising:
    a frame transmitter to transmit a data frame wirelessly, the data frame containing a frame identifier and a variable that is to be modified according to a predetermined rule when the data frame directly received by a first subsequent wireless terminal is forwarded from the first subsequent wireless terminal to a second subsequent wireless terminal, as well as when the data frame is forwarded from the second subsequent wireless terminal to yet another subsequent wireless terminal;
    a memory to store a record of the variable at the time of transmission of the data frame by the frame transmitter;
    a frame receiver to receive a data frame wirelessly transmitted from one of the first and second subsequent wireless terminals which have forwarded the data frame originally transmitted by the frame transmitter, the received data frame having the same frame identifier as the data frame transmitted by the frame transmitter; and
    a frame reception recognizer to recognize that the first subsequent wireless terminal has received the data frame transmitted by the frame transmitter, when a difference between the variable contained in the received data frame and the variable stored in the memory is one, and that the second subsequent wireless terminal has received the data frame transmitted by the transmitting, when the difference between the variable contained in the received data frame and the variable stored in the memory is two.

2. The wireless terminal according to claim 1, wherein, when the wireless terminal is a last wireless terminal, the wireless terminal further comprises a response frame transmitter operative in response to reception of the data frame from a preceding wireless terminal to transmit a response frame to the preceding wireless terminal.

3. The wireless terminal according to claim 1, wherein the wireless terminal further comprises a response frame receiver to receive, from the first subsequent wireless terminal as a last wireless terminal, a response frame indicative of reception of the data frame.

4. The wireless terminal according to claim 1, wherein, if the frame receiver does not receive the data frame within a predetermined time, the frame transmitter retransmits the data frame.

5. The wireless terminal according to claim 1, wherein, when the data frame retransmitted from a preceding wireless terminal is received and if the data frame has already been received and transmitted to the first subsequent wireless terminal, the wireless terminal transmits, to the preceding wireless terminal, a completion-of-transmission frame indicative of completion of transmission of the data frame.

6. The wireless terminal according to claim 1, wherein the frame receiver receives, from a last wireless terminal, a response frame indicative of reception of the data frame.

7. The wireless terminal according to claim 1, wherein the frame transmitter receives the data frame from a preceding wireless terminal and transmits the received data frame by wireless to the first subsequent wireless terminal.

8. The wireless terminal according to claim 1, further comprising:
    an identifier memory to store the frame identifier assigned to the data frame transmitted by the frame transmitter; and
    an identifier comparator to compare the frame identifier of the data frame received by the frame receiver with the frame identifier stored in the identifier memory.

9. The wireless terminal according to claim 8, wherein, when the wireless terminal is an originating wireless terminal, the wireless terminal further comprises an identifier assigning unit to assign the frame identifier to the data frame to be transmitted wirelessly from the frame transmitter.

10. The wireless terminal according to claim 1, wherein the variable that is to be modified each time the data frame is forwarded is a time-to-live variable that is given a predetermined value by a source wireless terminal and decremented by one each time the data frame is forwarded to another wireless terminal.

11. A wireless communication method for a wireless terminal constituting an ad-hoc network to perform communication, the method comprising:
    transmitting a data frame wirelessly, the data frame containing a frame identifier and a variable that is to be modified according to a predetermined rule when the data frame directly received by a first subsequent wireless terminal is forwarded from the first subsequent wireless terminal to a second subsequent wireless terminal, as well as when the data frame is forwarded from the second subsequent wireless terminal to yet another subsequent wireless terminal;

storing in a memory a record of the variable at the time of transmission of the data frame by the transmitting;

receiving a data frame wirelessly transmitted from one of the first and second subsequent wireless terminals which have forwarded the data frame originally transmitted by the transmitting, the received data frame having the same frame identifier as the data frame transmitted by the transmitting;

recognizing that the first subsequent wireless terminal has received the data frame transmitted by the transmitting, when a difference between the variable contained in the received data frame and the variable stored in the memory is one; and recognizing that the second subsequent wireless terminal has received the data frame transmitted by the transmitting, when the difference between the variable contained in the received data frame and the variable stored in the memory is two.

\* \* \* \* \*